US006470235B2

(12) United States Patent
Kasuga et al.

(10) Patent No.: US 6,470,235 B2
(45) Date of Patent: Oct. 22, 2002

(54) AUTHORING SYSTEM AND METHOD, AND STORAGE MEDIUM USED THEREWITH

(75) Inventors: Tomoaki Kasuga, Tokyo; Ayako Okita, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/878,648

(22) Filed: Jun. 11, 2001

(65) Prior Publication Data

US 2002/0038168 A1 Mar. 28, 2002

(30) Foreign Application Priority Data

Jun. 12, 2000 (JP) ........................................ 2000-175159

(51) Int. Cl.[7] .............................................. G05B 19/04
(52) U.S. Cl. ........................ 700/246; 700/245; 700/250; 700/253; 700/11; 700/17; 700/53; 707/500.1; 707/501.1; 707/511; 707/513; 701/23; 701/200; 701/210; 701/211
(58) Field of Search ................................. 700/245, 246, 700/250, 253, 17, 11, 56, 83, 86, 45, 264; 364/140, 146; 345/250; 382/181, 190, 209; 707/511, 513; 701/200, 210, 211, 501.1, 500.1, 23; 706/45, 46, 59, 60

(56) References Cited

U.S. PATENT DOCUMENTS

| 5,086,056 A | * | 2/1992 | Janssens et al. ......... 264/297.2 |
| 5,822,745 A | * | 10/1998 | Hekmatpour ................ 706/59 |
| 5,870,768 A | * | 2/1999 | Hekmatpour ............ 707/501.1 |
| 5,875,108 A | * | 2/1999 | Hoffberg et al. ............... 700/17 |
| 5,901,246 A | * | 5/1999 | Hoffberg et al. ............ 382/209 |
| 6,081,750 A | * | 6/2000 | Hoffberg et al. ............... 700/17 |
| 6,167,426 A | * | 12/2000 | Payne et al. ................ 340/7.29 |
| 6,259,969 B1 | * | 7/2001 | Tackett et al. .............. 700/264 |
| 6,363,301 B1 | * | 3/2002 | Tackett et al. .............. 700/246 |
| 6,366,933 B1 | * | 4/2002 | Ball et al. .................... 707/511 |

OTHER PUBLICATIONS

Monzani et al., Integrating behavioural animation techniques, 2001, Internet. pp. 1–10.*
Shimano et al., VAL: A versatile robot programming and control system, 1979, IEEE, pp. 878–883.*
Bredenfeld, C0–Design tool construction using APICES, 1999, Internet, pp. 126–130.*
Wu, Methodology of generating recovery procedures in a robotic cell, 1999, Internet, pp. 799–804.*

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer

(57) ABSTRACT

In an authoring system, a user creates and edits a scenario for a robot by using a GUI screen and a mouse. An authoring tool converts the scenario into a mnemonic code called "RCODE". When an RCODE action-control program is debugged, the RCODE program is extracted and encrypted step by step. The encrypted program is sequentially transferred to the robot by means of radio communication. The interpreter of the robot performs debugging by sequentially interpreting and executing the transferred program.

29 Claims, 16 Drawing Sheets

PULL-DOWN MENU OF FILE MENU

PULL-DOWN MENU OF GROUP MENU

AUTHORING SYSTEM AND METHOD, AND STORAGE MEDIUM USED THEREWITH

BACKGROUND OF THE INVENTION

1. Field of the Invention

The present invention relates to authoring systems and methods for creating data in accordance with a predetermined scenario. In particular, the present invention relates to an authoring system and method for creating consecutive commands and data that describe predetermined action patterns, and to a storage medium used therewith. Specifically, the present invention relates to an authoring system and method that create action patterns by using a set of components defining action statuses of a robot, and in particular, to an authoring system and method that create action patterns by using each component displayed on a computer display.

2. Description of the Related Art

A machine that uses electric or magnetic operations to perform movements imitating the action of a human is called a "robot". It is said that the word "robot" is derived from the Slavic word "robota" (slave machine). In Japan, it was in the 1960s that robots came into wide use. Many of the robots were industrial robots for the purpose of automating factories, such as manipulators and transfer robots.

Recently, in research and development of legged mobile robots such as pet robots which imitate the body mechanism and action of quadrapedal-walking animals such as cat and dog, or humanoid robots which imitate the body mechanism and action of bipedal orthograde living things, such as human and monkey, and in research and development of stable walking control of the legged mobile robots, much progress has been made and practical use of the legged mobile robots is greatly expected. Compared with crawler robots, the legged mobile robots are unstable and it is difficult to control posture and walking by the legged robots. However, the legged mobile robots are preferable in that they are able to perform flexible walking and running actions, such as going-up/down of the stairs and getting-over of an obstacle.

Stationary robots that are installed in particular locations for use, such as arm robots, are used within fixed and local work spaces for assembling and selecting components. Conversely, mobile robots are used in non-limited work spaces. Each of the mobile robots can perform predetermined or arbitrary human work by freely moving on or out of a predetermined path, and can provide various services in which the mobile robot replaces a human, a dog, or another living thing.

One use of the legged mobile robots is to perform, for a human, various types of difficult work in industrial and production activities, etc. For example, the legged mobile robots perform dangerous work and difficult work such as maintenance operations in atomic power plants, thermal power plants, or petrochemical plants, component-carrying-and-assembling operations in manufacturing factories, cleaning for high buildings, and rescue in the scenes of fires.

Another use of the legged mobile robots is to attend on people rather than to support the above types of work, that is, "coexistence" with people or "entertainment". Robots of this type emulate the action mechanism of a legged walking living thing having relatively high intelligence, such as human or dog (as a pet) and various quadrapedal expressions of feelings. It is required that the robots of this type not only faithfully execute pre-input action patterns, but also enable vivid responsive expressions in response to human's words and attitudes (e.g., praising, scolding, slapping, etc.).

In conventional amusement machines, the relationship between an operation by a user and a responsive action is fixed, so that the action by the machine cannot be changed so as to match user's preference. As a result, the user come to get tired of the machine since it repeats the same action.

Conversely, intelligent robots have action-caused models. By changing the model based on input information from the exterior, such as sound, images, and tactile sensation so that the action is determined, each intelligent robot realizes autonomous thought and control of action. By preparing a feeling model or an instinct model, the robot can exhibit an autonomous action which matches the feeling and instinct of the robot itself. The robot includes an image input device and a sound input/output device and performs image-recognition processing and sound-recognition processing, whereby realistic communication with the human is realized in high intelligent level.

In addition, by providing the robot with a function of changing the model in response to detection of an external stimulus such as an operation by the user, that is, "learning effect", the robot can provide an action pattern which makes the user get tired or which matches user's preference.

A recent type of legged mobile robot can be regarded as a type of computer system because it has high ability to process information. Therefore, an action pattern realized in the robot, or a high-level and consecutive action sequence, formed by a combination of a plurality of basic action patterns, is formed by performing operations similar to those in computer programming.

It is expected that as the number of robots in use increases, the robots will come into wide use not only in the industry but also in ordinary households and everyday life. In particular, concerning entertaining products, cases are expected in which ordinary consumers having no high-level knowledge on the computer and computer programming will purchase robots for their use. Also to the ordinary consumers as ordinary users, preferably, a tool for supporting relatively easy and efficient creation and editing of a robot-action sequence through interactive processing, that is, an authoring tool is provided.

SUMMARY OF THE INVENTION

Accordingly, it is an object of the present invention to provide an authoring system and method for creating consecutive commands and data which describe predetermined action patterns of a robot, and a storage medium used with the system and method.

It is another object of the present invention to provide an authoring system and method in which a set of components defining action statuses of a robot is used to create action patterns, and a storage medium used with the system and method.

It is a further object of the present invention to provide an authoring system and method in which an arrangement of components displayed on a computer display is used to create action patterns, and a storage medium used with the system and method.

To these ends, according to an aspect of the present invention, there is provided an authoring system for creating and editing an action-control program for controlling the action of a robot, the authoring system. The authoring system includes an editing unit which provides a user with a work site for creating and editing a scenario concerning the action of the robot, and a converting unit which converts the scenario into a program code interpretable by the robot.

Preferably, the editing unit provides the user with components representing frequently used action statuses and processing routines or models thereof, and an operation screen on which by using a coordinate designating device to send instructions, each of the components is selectively arranged.

The editing unit may provide the user with an environment for creating and editing a script having the form of a predetermined programming language.

The converting unit may convert an action scenario represented by an arrangement of components and/or an action scenario described in the form of a script into a mnemonic code which can be interpreted by the robot.

The authoring system may further include a communication unit for transferring the program code to the robot.

The communication unit may perform radio data communication with the robot.

The communication unit may extract the program code step by step and may transfer the extracted program code to the robot.

The communication unit may transfer the program code in an encrypted form.

The robot includes an interpretation unit which interprets the program code transmitted by the communication unit, and a driving-control unit which drives the robot in accordance with the result of interpretation by the interpretation unit.

The interpretation unit in the robot may interpret and execute the transmitted program code in units of steps.

Preferably, the robot stores posture-transition-limiting information on each action and each posture which can directly be changed from the present status of the robot and on each posture which can be changed through an action and a posture, and based on the posture-transition-limiting information, the driving-control unit converts the content of the program code into a form which enables transition of posture.

Preferably, the posture-transition-limiting information is stored in the form of a directed graph composed of nodes representing possible postures of the robot and action arcs which each link two nodes having a possible transition therebetween, and the driving-control unit searches the directed graph and converts the content of the program code into a form which enables transition of posture.

According to another aspect of the present invention, there is provided an authoring method for creating and editing an action-control program for controlling the action of a robot. The authoring method includes an editing step which provides a user with a work site for creating and editing a scenario concerning the action of the robot, and a converting step which converts the scenario into a program code interpretable by the robot.

Preferably, the editing step provides the user with components representing frequently used action statuses and processing routines or models thereof, and an operation screen on which by using a coordinate designating device to send instructions, each of the components is selectively arranged.

The editing step may provide the user with an environment for creating and editing a script having the form of a predetermined programming language.

The converting step may convert an action scenario represented by an arrangement of components and/or an action scenario described in the form of a script into a mnemonic code which can be interpreted by the robot.

The authoring method may further include a communication step for transferring the program code to the robot.

The communication step may perform radio data communication with the robot.

The communication step may extract the program code step by step and may transfer the extracted program code to the robot.

The communication step may transfer the program code in an encrypted form.

The robot may include an interpretation step which interprets the program code transmitted in the communication step, and a driving-control step which drives the robot in accordance with the result of interpretation in the interpretation step.

The interpretation step may interpret and execute the transmitted program code in units of steps.

Preferably, the robot stores posture-transition-limiting information on each action and each posture which can directly be changed from the present status of the robot and on each posture which can be changed through an action and a posture, and based on the posture-transition-limiting information, the driving-control step converts the content of the program code into a form which enables transition of posture.

Preferably, the posture-transition-limiting information is stored in the form of a directed graph composed of nodes representing possible postures of the robot and action arcs which each link two nodes having a possible transition therebetween, and the driving-control step searches the directed graph and converts the content of the program code into a form which enables transition of posture.

According to a further aspect of the present invention, there is provided a storage medium physically containing, in a computer-readable form, computer software described so as to control a computer system to execute authoring processing for creating and editing an action-control program for controlling the action of a robot. The computer software includes an editing step which provides a user with a work site for creating and editing a scenario concerning the action of the robot, and a converting step which converts the scenario into a program code interpretable by the robot.

Preferably, the editing step provides the user with components representing frequently used action statuses and processing routines or models thereof, and an operation screen on which by using a coordinate designating device to send instructions, each of the components is selectively arranged.

The editing step may provide the user with an environment for creating and editing a script having the form of a predetermined programming language.

The converting step may convert an action scenario represented by an arrangement of components and/or an action scenario described in the form of a script into a mnemonic code which can be interpreted by the robot.

The computer software may further include a communication step for transferring the program code to the robot.

The storage medium provided according to the further aspect of the present invention is a medium that physically provides computer software in a computer-readable form a computer system capable of executing various program codes. The medium is a removable and portable medium such as a compact disk, a floppy disk, or a magneto-optical disk. Also, it is technically possible to provide computer software in a computer-readable form to a specified computer system via a transmission medium such as a wired or wireless network.

In the above storage medium, a cooperative relationship in structure or function between predetermined computer software and the storage medium, which is required to implement the functions of the computer software in a computer system, is defined. In other words, by installing predetermined computer software in a computer system through the storage medium provided according to the further aspect of the present invention, the computer system exhibits cooperative operation, whereby operation and advantages similar to those in the authoring system and method provided according to the aspects of the present invention can be obtained.

According to the present invention, an authoring system and method for creating consecutive commands and data which describe predetermined action patterns of a robot can be provided, and a storage medium used therewith can be provided.

According to the present invention, an authoring system and method can be provided in which a set of components defining action statuses of a robot is used to create action patterns, and a storage medium used therewith can be provided.

According to the present invention, an authoring system and method can be provided in which an arrangement of components displayed on a computer display is used to create action patterns, and a storage medium used therewith can be provided.

Further objects, features and advantages of the present invention will become apparent from the following description of the preferred embodiment with reference to the attached drawings.

DESCRIPTION OF THE PREFERRED EMBODIMENTS

An embodiment of the present invention is described below with reference to the accompanying drawings.

A. Construction of Authoring System

Figure 1:
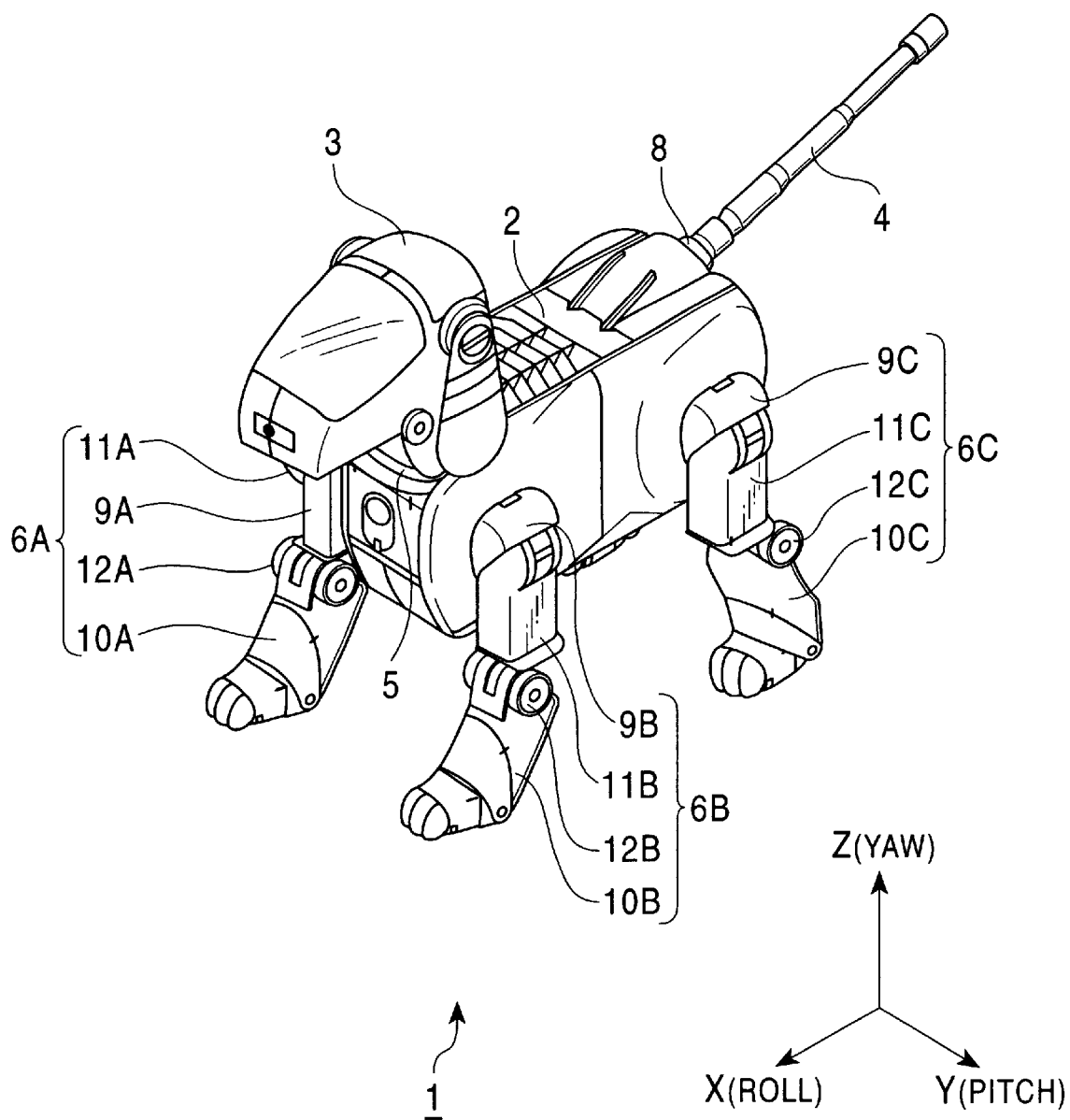
FIG. 1 is an exterior view of a mobile robot that uses four legs to walk, to which the present invention is applied.

FIG. 1 shows an exterior construction of a quadrapedal-walking mobile robot 1 to which the present invention is applied. As shown in FIG. 1, the robot 1 is an articulated robot modeled based on the shape and structure of a quadrapedal animal. In particular, in this embodiment, the robot 1 has an aspect in which it is a robot pet designed to imitate the shape and structure of a dog as a typical pet. For example, it coexists with people in a human accommodating environment and can exhibits actions in response to operations by a user.

The robot 1 is constituted by a body unit 2, a head unit 3, a tail 4, and four legs or leg units 6A to 6D.

Figure 2:
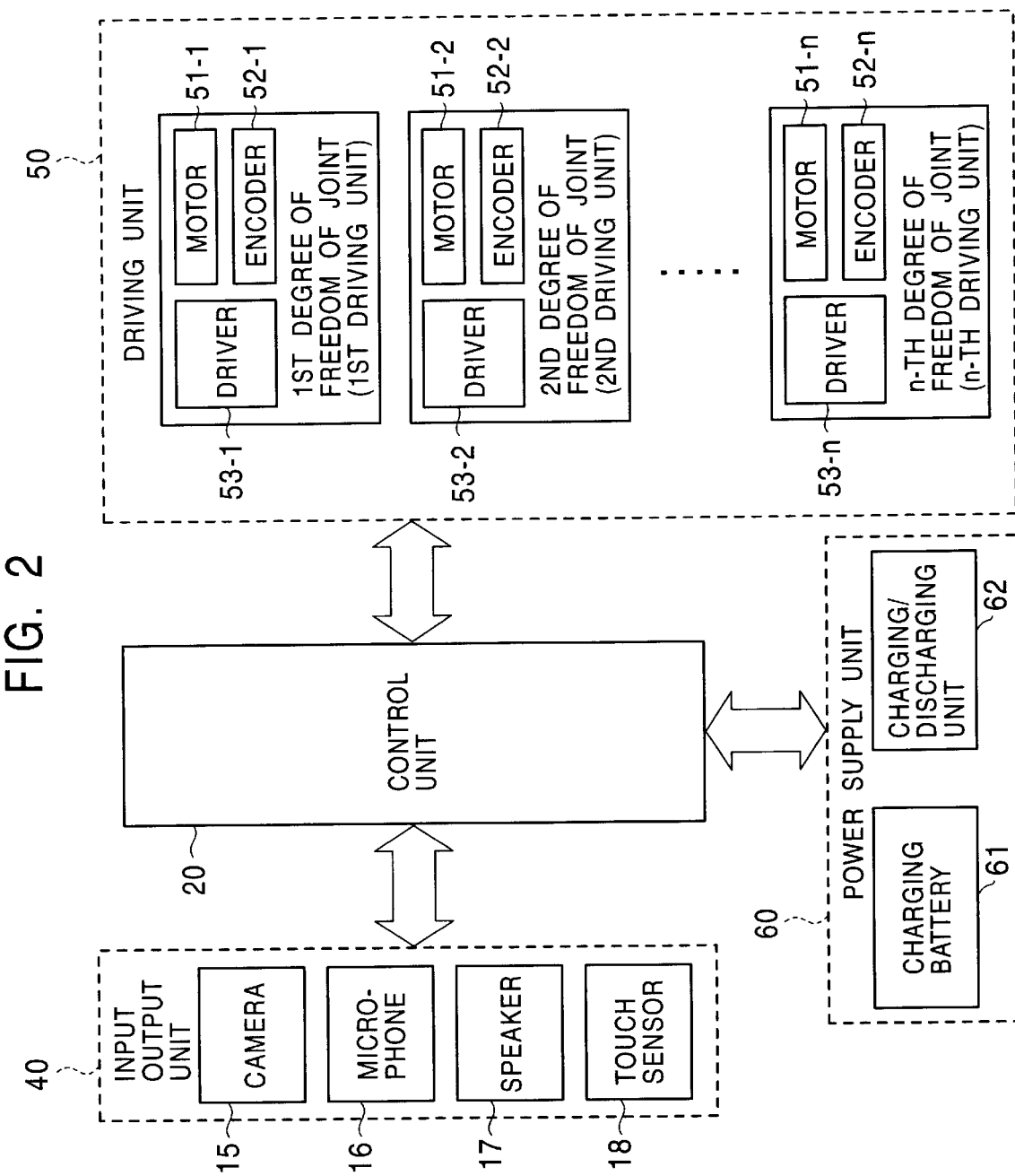
FIG. 2 is a block diagram showing the electric and control systems of the robot shown in FIG. 1.

The head unit 3 is joined to the substantial front end of the body unit 2 by a neck joint 5 having degrees of freedom in axial directions of roll, pitch, and yaw (indicated by the arrows in FIG. 1). Referring to FIG. 2, the head unit 3 includes a charge-coupled device (CCD) camera 15 corresponding to a pair of dog's eyes, a microphone 16 corresponding to a pair of dog's ears, a speaker 17 corresponding to a dog's mouth, and a touch sensor 18 corresponding to a feeling of touch. The head unit 3 may include other types of sensors constituting living five senses.

The tail 4 is joined to the substantial top-rear end of the body unit 2 so as to curve or swing by a tail joint 8 having degrees of freedom in roll and pitch axes.

The leg units 6A and 6B are used as fore legs, and the leg units 6C and 6D are used as hind legs. The leg units 6A to 6D are each formed by combining each of thigh units 9A to 9D and each of shin units 10A to 10D, and are respectively joined to the front right and left corners and rear right and left corners of the bottom surface of the body unit 2. The thigh units 9A to 9D are jointed to predetermined parts of the body unit 2 by hip joints 11A to 11D having degrees of freedom in roll, pitch, and yaw axes, respectively. The thigh units 9A to 9D and the shin units 10A to 10D are joined by knee joints 12A to 12D, respectively.

In the robot 1 having the above-described construction, by using commands from a control unit (described later) to drive joint actuators, the head unit 3 can be swung vertically and horizontally, the tail 4 can be swung, and actions performed by cooperatively driving the leg units 6A to 6D, such as walking and running, are realized.

The degrees of freedom in the joints of the robot 1 are actually provided by rotational driving of joint actuators (not shown) provided for axes. The robot 1 has an arbitrary number of degrees of freedom in joints, and the gist of the present invention is not limited by the number.

FIG. 2 shows a schematic construction of an electric and control system of the robot 1. The robot 1 includes a control unit 20 which performs integral control of overall operations and performs other types of data processing, an input/output unit 40, a driving unit 50, and a power-supply unit 60. The units are described below.

The input/output unit 40 includes various sensors corresponding to the five senses, such as the CCD camera 15 corresponding to the eyes of the robot 1, the microphone 16 corresponding to the ears of the robot 1, and the touch sensor 18 corresponding to a feeling of touch, which are input portions. The input/output unit 40 also includes, as an output portion, the speaker 17 corresponding to the mouth of the robot 1. The output portion can express user feedback from the robot 1 in a form other than a mechanical movement pattern using legs, etc.

By including the camera 15, the robot 1 can recognize the shape and color of an arbitrary object existing in a work space. The robot 1 may include not only a viewing means such as the camera 15, but also a receiver which receives transmitted waves such as infrared radiation, sound waves, ultrasonic waves, and radio waves. In this case, based on an output from each sensor for each type of transmitted waves, a position and direction from the transmission source can be determined.

A driving unit 50 is a functional block which enables mechanical movements of the robot 1 in accordance with predetermined movement patterns sent from the control unit 20, and is constituted by driving elements provided for the roll, pitch, and yaw axes of the neck joint 5, the tail joint 8, the hip joints 11A to 11D, and the shin joints 12A to 12D. In the example shown in FIG. 2, the robot 1 has n degrees of freedom of joint. Accordingly, n driving elements constitute the driving unit 50. Each of the driving elements includes a combination of a motor 51 which performs a rotational movement on a predetermined axis, an encoder 52 which detects a rotational position of the motor 51, and a driver 53 which adaptively controls the rotational position and rotational speed of the motor 51 based on the output of the encoder 52.

A power supply unit 60 is literally a functional module for supplying power to each electric circuit in the robot 1. The robot 1 in this embodiment is of an autonomically driven type, and the power supply unit 60 is constituted by a charging battery 61 and a charging/discharging unit 62 which controls the charged/discharged state of the charging battery 61.

The charging battery 61 has the form of a "battery pack" in which, for example, a plurality of nickel-cadmium cells are packaged to form a cartridge.

The charging/discharging unit 62 grasps the remaining amount of power in the charging battery 61 by measuring a terminal voltage and the amount of charging/discharging current of the charging battery 61 and an ambient temperature of the charging battery 61, and determines a charging start time and a charging stop time. The charging start time and the charging stop time, determined by the charging/discharging unit 62, are posted to the control unit 20, and are used as triggers for the robot 1 to start and stop a charging operation. The details of the charging operation are described later.

The control unit 20 corresponds to a "brain" and is provided in, for example, the head unit 3 or the body unit 2 of the robot 1.

Figure 3:
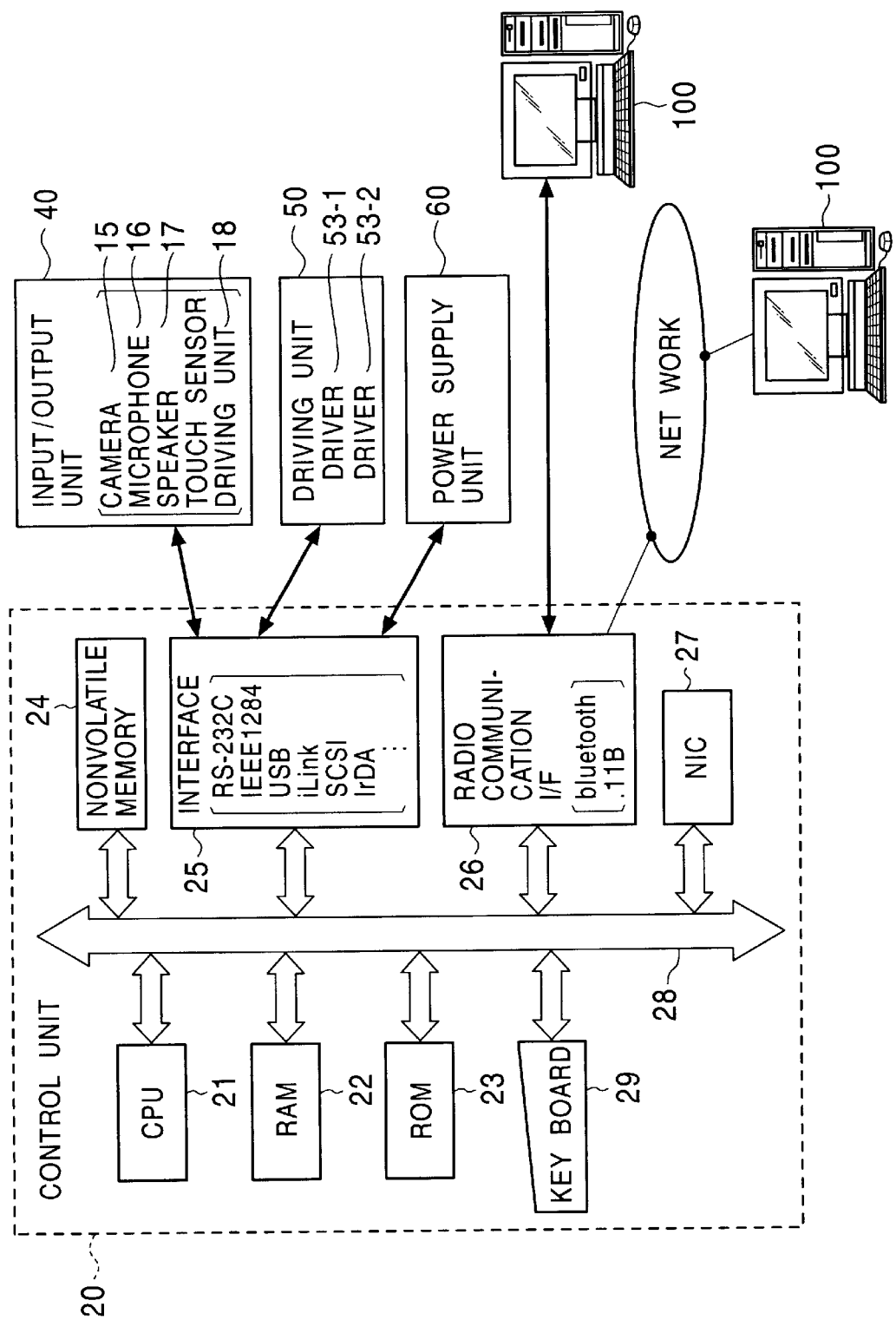
FIG. 3 is a detailed block diagram showing the control unit 20 shown in FIG. 2.

FIG. 3 shows a more detailed construction of the control unit 20. As shown in FIG. 3, a central processing unit (CPU) 21 as a main controller is connected by a bus 28 to circuit-component unit such as memories and to peripheral units. A unique address (memory address or I/O address) is assigned to each unit on the bus 28. The CPU 21 can communicate with a particular unit by designating an address.

A random access memory (RAM) 22 is a writable memory formed by a volatile memory such as a dynamic RAM (DRAM), and is used to load program codes to be executed by the CPU 21 and to temporarily store work data.

A read-only memory (ROM) 23 permanently stores programs and data. Program codes stored in the ROM 23 include a self-diagnosis-test program to be executed when supplying main power to the robot 1, and control programs for defining the actions of the robot 1.

The control programs of the robot 1 include a "sensor-input-processing program" for processing inputs from the camera 15 and the microphone 16, a "behavior-commanding program" for generating, based on sensor inputs and predetermined action models, behavior or movement patterns of the robot 1, a "driving-control program" for controlling the driving of each motor and the sound output of the speaker 17 in accordance with the generated movement patterns. The generated movement patterns may include, not only ordinary walking movement and running movement, but also highly entertaining actions such as paw-raising, waiting, sitting, and animal's making sound like bowwow.

Control programs of another type for the robot 1 include various action-sequence programs created and edited by an authoring tool. The authoring tool is activated, for example, on an external computer system under an environment in which predetermined software is executed. The authoring tool and each program created and edited on the tool are described later.

A nonvolatile memory 24 is formed by, for example, an electrically erasable and rewritable memory element like an electrically erasable and programmable ROM. The nonvolatile memory 24 is used to store, in a nonvolatile form, data to be sequentially updated. The data to be sequentially updated includes, for example, a model for defining behavior pattern of the robot 1.

The interface 25 establishes mutual connection between the control unit 20 and each apparatus outside the control unit 20 so that data exchange can be performed. The interface 25 inputs/outputs data from/to the camera 15, the microphone 16, and the speaker 17. The interface 25 inputs/outputs data or commands from/to each driver (e.g., the driver 53-1) in the driving unit 50. Also, the interface 25 can transmit/receive charging-start and charging-stop signals to/from the power supply unit 60.

The interface 25 has a serial interface such as RS (Recommended Standard)-232C, a parallel interface such as IEEE (Institute of Electrical and Electronic Engineers) 1284, and general-purpose interfaces for establishing connection to computer peripheral units, such as USB (Universal Serial Bus) interface, i-Link (IEEE 1394) interface, and SCSI (small computer system interface). The interface 25 may be used to transfer programs and data to/from a locally connected external unit.

By further providing the interface 25 with infrared communication (IrDA) interface, the interface 25 can communicate with an external unit. According to a receiving sensitivity aspect, it is preferable to provide infrared-communication transmitter and receiver to ends of the robot 1, such as the head unit 3 and the tail unit 4.

The control unit 20 includes the radio communication I/F 26 and a network interface card (NIC) 27, and can perform proximity radio communication based on "Bluetooth" and "IEEE 802.11b", or can perform data communication with an external host computer 100 via a local area network (LAN) such as Ethernet and the Internet.

An object of the above data communication between the robot 1 and the host computer 100 is to remote-control an action of the robot 1 by using remote computer resources. Another object of the data communication is to supply the robot 1 via a network with data and programs required for action control in the robot 1, such as action models and program codes. A further object of the data communication is to download a robot-action-control program which is created and edited on the host computer 100 by using an authoring tool and to perform real-time processing for debugging the robot-action-control program by cooperatively operating the host computer 100 and the robot 1. The authoring tool and the debugging processing are described below.

The control unit 20 may be provided with a keyboard 29 having alphanumeric keys. The keyboard 29 is used not only to directly input a command in a work place and but also to input an owner-authentication information such as a password.

The robot 1 in this embodiment can perform autonomic actions when the control unit 20 executes a predetermined control program. The robot 1 has input units corresponding to the five senses of a human or animal, such as an image input unit (i.e., the camera 15), a sound input unit (i.e., the microphone 16), and the touch sensor 18. The robot 1 also has intelligence to execute rational or emotional actions in response to the above external inputs.

The robot 1 shown in FIGS. 1 to 3 has the following features.
(1) When the robot 1 is instructed to perform a transition from a posture to another posture, it performs the transition through a feasible intermediate posture which is prepared beforehand, without performing a direct transition between the postures.
(2) When the robot 1 reaches an arbitrary posture, it can receive a notification.
(3) The robot 1 can perform posture control by separately managing postures in each of the head unit 3, the tail unit 4, the leg units 6A to 6D, etc. In other words, separately from the posture of the entirety of the robot 1, a posture in each unit can be managed.
(4) In the robot 1, parameters for representing action details based on an action command can be transferred.

As shown in FIG. 3, the robot 1 in this embodiment is connected to the external host computer 100 via the network. Also, the robot 1 may be linked to the host computer 100 by radio communication (e.g., "Bluetooth", "IEEE 802.11b" proximity radio data communication) or another communication means.

On the host computer 100, a predetermined software-executing environment is created. Under this environment, by activating the authoring tool, and performing interactive processing, the action sequence of the robot 1 can be relatively-easily and efficiently formed. The details of the authoring tool are described later.

Figure 4:
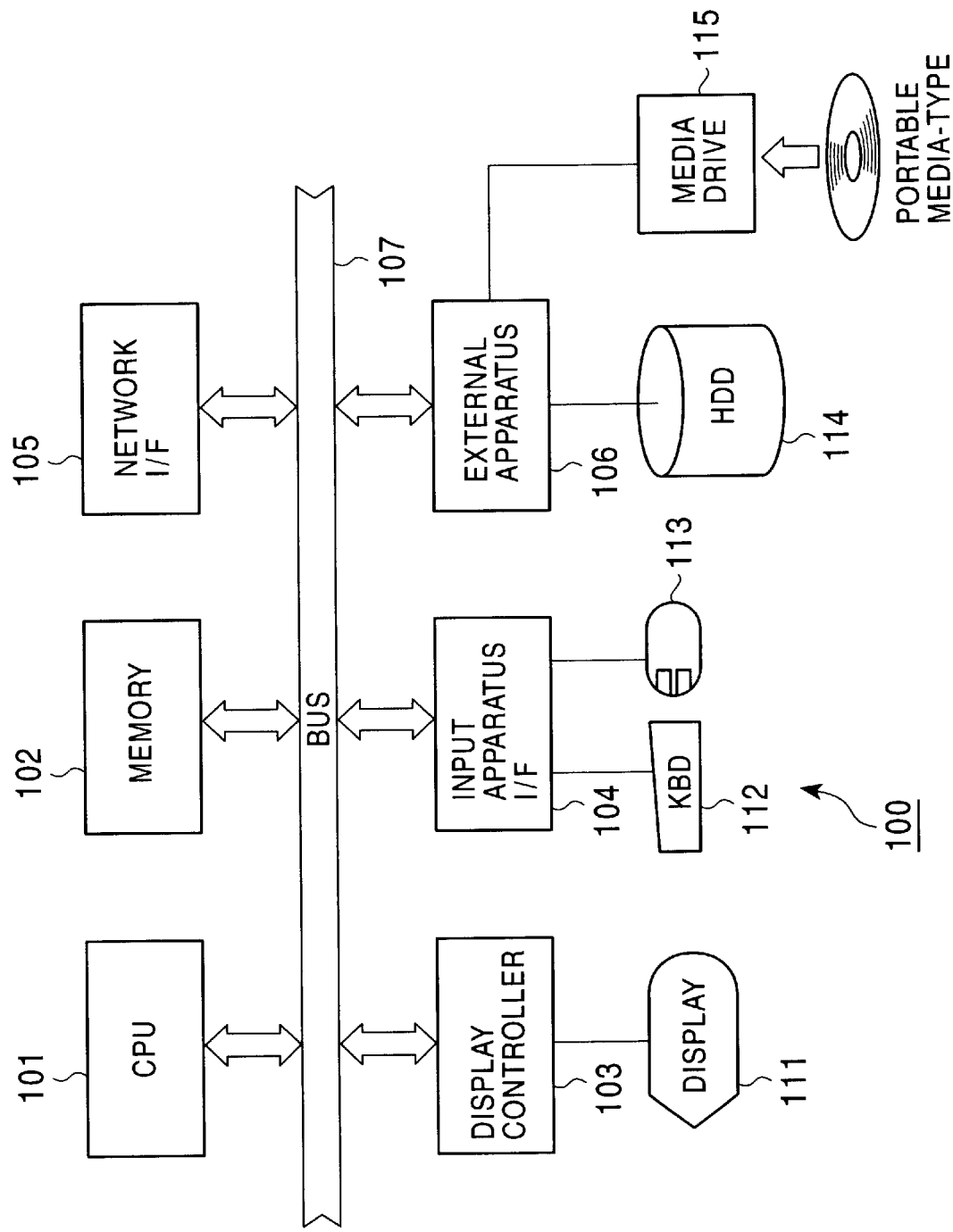
FIG. 4 is a block diagram showing a hardware configuration of the host computer 100 shown in FIG. 3.

FIG. 4 shows a schematic hardware construction of the host computer 100. Each component of the host computer 100 is described below.

A CPU 101 which is a main controller of the host computer 100 (hereinafter referred to also as the "system") can execute various applications under the control of an operating system (OS). It is preferable for the OS to provide a graphical user interface (GUI) environment. For example, UNIX or Windows 98/NT of Microsoft Corporation in the United States may used as the OS.

As shown in FIG. 4, the CPU 101 is connected to other devices (described later) by a bus 107. Unique memory addresses or I/O addresses are assigned to devices on the bus 107. The CPU 101 can access the devices by using the addresses. An example of the bus 107 is a peripheral component interconnect (PCI) bus.

A memory 102 stores a program code which is executed by the CPU 101 and temporarily stores data of an operation being executed. It should be understood that the memory 102 includes both a nonvolatile memory and a volatile memory.

A display controller 103 is a dedicated controller for actually processing a rendering command issued by the CPU 101, and supports bitmap-rendering functions corresponding to, for example, super video graphic array (SVGA) or extended graphic array (XGA) standard. Rendering data processed by the display controller 103 is output and displayed on a display 111 after being temporarily written in a frame buffer (not shown). The display 111 is, for example, a cathode-ray tube, or a liquid crystal display.

An input apparatus interface 104 connects a user-input apparatus, such as the keyboard 112 and a mouse 113, to the system 100. The input apparatus interface 104 generates an interruption to the CPU 101 in response to a key-used input from the keyboard 112 or coordinate designation input by the mouse 113.

A network interface 105 connects the system 100 to a network such as a LAN, or links the system 100 to a proximity radio data communication such as "Bluetooth" or "IEEE 802.11b". In general, the network interface 105 is provided as a LAN adapter card and is used in a form in which it is loaded in a PCI bus slot on a motherboard (not shown).

In the example shown in FIG. 3, the host computer 100 is linked to the robot 1 via radio data communication or a network. However, both may be linked to each other by another communication means.

On the network, a plurality of host computers (not shown9 are linked to one another in transparent condition, so that a distributed computing environment is created. On the network, software programs, data, contents, etc., are distributed. For example, the authoring tool in this embodiment, the robot action sequence program created and edited by the authoring tool, etc., can be distributed via the network. This type of program/data distribution service may be performed with or without charge.

An external apparatus interface 106 connects external apparatuses, such as a hard disk drive (HDD) 114 and a media drive 115, to the system 100. The external apparatus interface 106 is in accordance with an interface standard such as integrated drive electronics (IDE) or small computer system interface (SCSI).

The HDD 114 is a known external storage unit in which a magnetic disk as a storage carrier is fixedly provided, and is superior to other types of external storage units in storage capacity and data transfer speed. Putting a software program on the HDD 116 so as to be executable is called "installation" of the program in the system 100. Normally, in the HDD 114, the program code of the OS to be executed by the CPU 101, application programs, device drivers, etc., are stored in nonvolatile form. For example, the authoring tool in this embodiment, and the robot action sequence program created and edited by the authoring tool can be installed on the HDD 114.

The media drive 115 is an apparatus in which a portable media-type storage medium such as a compact disk, a magneto-optical disk, or a digital versatile disk is loaded and its data recording surface is accessed. Each media-type storage medium is mainly used for the purpose of performing backup of software programs and data files in the form of computer-readable data, and for the purpose of moving (including selling, circulating, and distributing) these among systems. For example, the authoring tool in this embodiment, the robot action sequence program created and edited by the authoring tool, etc., can be physically circulated and distributed by using each media-type storage medium.

An example of the host computer 100 shown in FIG. 4 is an IBM-PC/AT (personal computer/advanced technology) compatible or a successor thereof. Definitely, a computer system having another architecture can be applied to the host computer 100 in this embodiment.

In this embodiment, the authoring tool activated on the host computer 100 is used to create and edit the action control program which consists of consecutive commands and data for describing predetermined action patterns of the robot 1. Also, the action control program created and edited by using the authoring tool is transferred to the robot 1 by using a radio communication means such as "Bluetooth" or "IEEE 802.11b", and is debugged by cooperatively operating the host computer 100 and the robot 1. In other words, an organized combination of the host computer 100 and the robot 1 creates an authoring system for the action control program for the robot 1.

An interpreter is a high-level-language program that reads and interprets a program described in RCODE form line by line. However, when in a debugging mode, an encrypted RCODE program is transmitted from the host computer 100, the interpreter decodes the program, and interprets and executes the decoded program.

A debugger is a program that finds an error (bug) in the RCODE program and supports the operation of correcting the error. In other words, the debugger can stop the execution of a program in a designated line and can refer to the contents of a memory and variables.

Middleware is a processing engine that controls walking of the robot 1 and other leg-used actions, performs processing for recognizing an image input from the camera 15, and performs processing for recognizing sound input from the microphone 16.

Each driver is a program code for operating each joint actuator and another type of hardware.

In this embodiment, the middleware and the driver are implemented by object-oriented programs. Object-oriented software is basically treated in units of modules which is each called an "object" integrating data and a processing procedure for the data. Also, by creating or combining a plurality of objects, as required, software is completed. In general, according to object-oriented programming, it is considered that software is efficiently developed and maintained.

The OS manages data communication between objects as described above and controls the execution of a program. The OS is also implemented by an object-oriented program.

B. Creation and Editing of Robot Action Program By Using Authoring Tool

Figure 6:
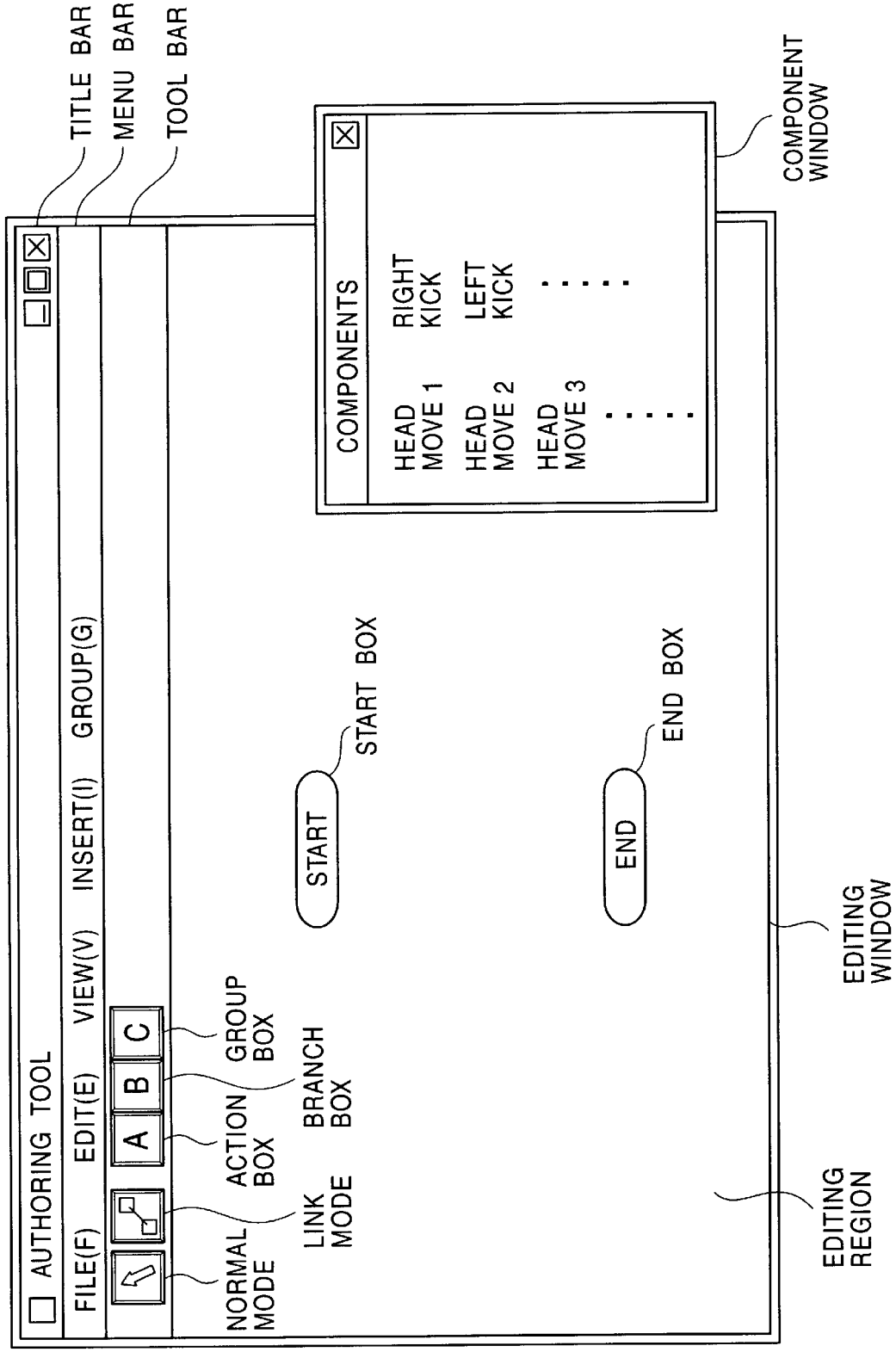
FIG. 6 is an illustration of a graphical-user-interface screen for a user to create and edit an action scenario for the robot shown in FIG. 1.

Next, a graphical user interface (GUI) screen is below described which is provided by the authoring tool in this embodiment and which is used for the user to create and edit an action scenario of the robot 1. FIG. 6 illustrates the GUI screen.

As shown in FIG. 6, the GUI screen includes an editing window in which editing operations are performed by clicking, and dragging and dropping with a mouse, and a component window which provides action procedures frequently used in the editing operations in the form of components.

In the editing window, from the top thereof, a title bar, a menu bar, a tool bar, and an editing region are arranged in this order.

The menu bar is a region in which processes selectable by clicking by the user are horizontally arranged. In this example, the menu items, "FILE (F)", "EDIT (E)", "VIEW (V)", "INSERT (I)", and "GROUP (G)" are prepared. By selecting one of the menu items, the corresponding pull-down menu appears.

Figure 7:
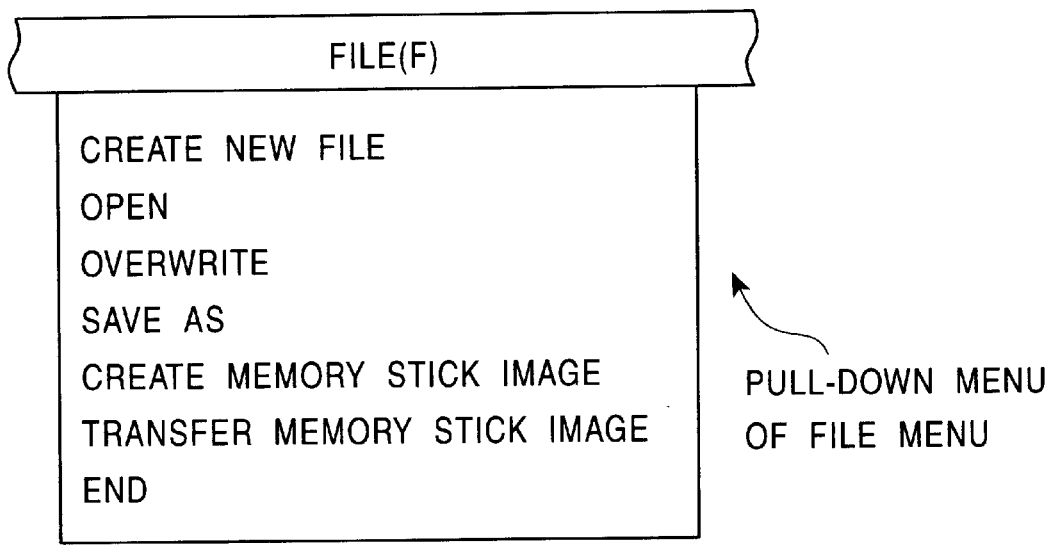
FIG. 7 is an illustration of a pull-down menu corresponding to the menu item "FILE"

FIG. 7 illustrates a pull-down menu corresponding to the menu item "FILE". As shown in FIG. 7, the pull-down menu has the sub-items, "CREATE NEW FILE", "OPEN", "OVERWRITE", "SAVE AS", "CREATE MEMORY STICK IMAGE", "TRANSFER MEMORY STICK IMAGE", and "END".

By selecting the item "CREATE NEW FILE", a new scenario (hereinafter referred to also as a "project") which describes consecutive actions of the robot 1 is created. When there has already been a project that is being edited, a dialog box appears which requests the user to save the project. The editing window in FIG. 6 is an initial screen displayed when a new project is created. In the editing window, a main group consisting of a "START" box and an "END" box which respectively correspond to the start and end of the project is displayed.

By selecting the "OPEN" item, a project saved as a file is opened in the editing window. When there has already been a project that is being edited, a dialog box is displayed which requests the user to save the project. In this embodiment, projects are treated as files having the extension "apk".

By selecting the "OVERWRITE" item, a project that is being edited is saved in a file having the same item name. At this time, a dialog box that queries about the file name does not appear.

By selecting the "SAVE AS" item, a dialog box that queries about the file name is displayed. In the dialog box, the user can designate the name of a directory in which the file is save and the file name. The project is saved in the designated directory with the file name.

By selecting the "CREATE MEMORY STICK IMAGE" item, an image file for writing to a Memory Stick (or storage media equivalent thereto) is created. In this embodiment, the image file is saved with the extension "aim" in the same directory in which the original "apk"-form file is saved.

By selecting the "TRANSFER MEMORY STICK IMAGE" item, the image file in the Memory Stick is created in a designated full path.

By selecting the "END" item, the execution of the authoring tool is ended.

Figure 8:
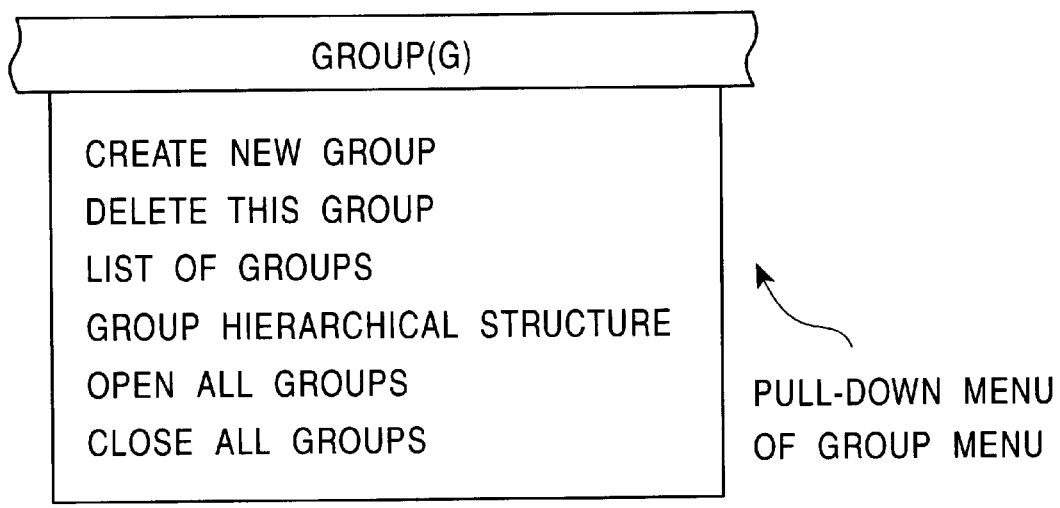
FIG. 8 is an illustration of a pull-down menu corresponding to the menu item "GROUP"

FIG. 8 illustrates a pull-down menu corresponding to the "GROUP" item. As shown in FIG. 8, this pull-down menu contains the items, "CREATE NEW GROUP", "DELETE THIS GROUP", "LIST OF GROUP", "GROUP HIERARCHICAL STRUCTURE", "OPEN ALL GROUPS", and "CLOSE ALL GROUPS".

By selecting the "CREATE NEW GROUP" item, a new group is created.

By selecting the "DELETE THIS GROUP" item, a group that is being displayed is deleted. Even if a group is deleted, a group box calling the group is not deleted..

By selecting the "LIST OF GROUP" item, a list of groups is displayed. By double-clicking on the name of a displayed group, the group can be opened.

By selecting the "GROUP HIERARCHICAL STRUCTURE", a hierarchical structure (calling structure)

of group is displayed. By double-clicking on the name of a displayed group, the group can be opened.

By selecting the "OPEN ALL GROUPS" item, the windows of all groups are opened.

By selecting the "CLOSE ALL GROUPS" item, the windows of all groups are closed, excluding the main group.

In addition, in the example shown in FIG. 6, the tool bar contains the tool buttons, "NORMAL MODE", "LINK MODE", "ACTION BOX", "BRANCH BOX", and "GROUP BOX".

By selecting the "NORMAL MODE" button, a mouse operation enters in a normal mode. For example, dragging each box functions as a transfer of the box.

By selecting the "LINK MODE" button, the mouse operation enters in a link mode. In other words, dragging each box functions as linking of boxes. A box as a link source may be dragged to a box as a link destination. When the "BRANCH BOX" button is linked, a dialog box for specifying branch conditions is displayed.

By selecting the "ACTION BOX" button, an action box is inserted into the lower editing region.

By selecting the "BRANCH BOX" button, a branch box is inserted into the lower editing region.

By selecting the "GROUP BOX" button, a group box is inserted into the lower editing region.

In the editing region in FIG. 6, the user can designate a type of process by using a combination of mouse operations such as clicking and dragging and a combination of a mouse operation and a key-used input.

For example, by clicking the left button of the mouse, a box can be selected.

By double-clicking the left button of the mouse, a property is displayed and/or a group is opened.

When the user drags the mouse while pressing its left button in the normal mode, and a cursor corresponding to the mouse is positioned on a box, the box is moved. When the cursor is positioned out of a box, a range selection is performed. In the link mode, the position of the mouse can be moved.

Figure 9:
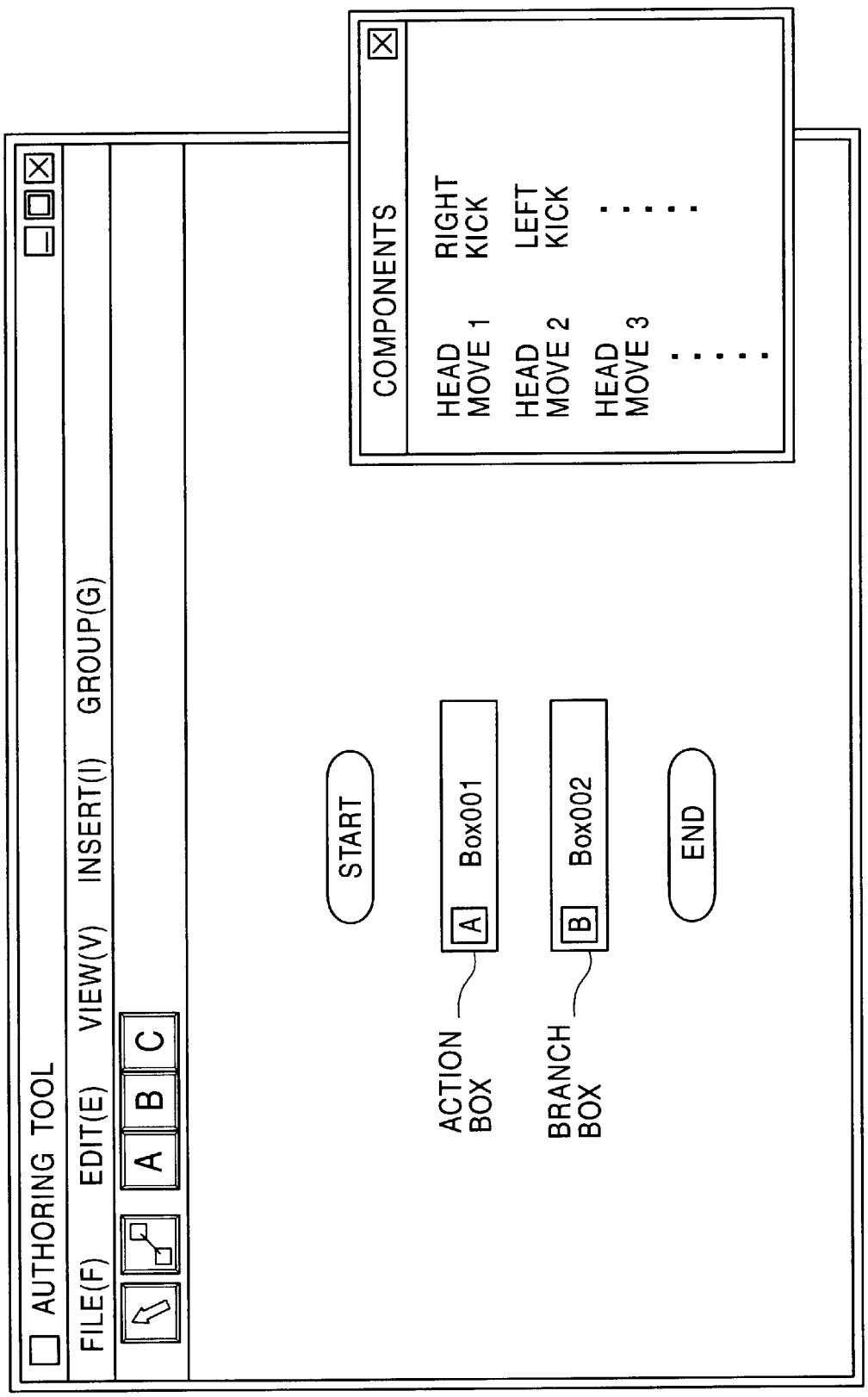
FIG. 9 is an illustration of an editing window on which an action box A and a branch box B are displayed.

FIG. 9 shows that an action box A and a branch box B are displayed in the editing window. The boxes have "Box001" and "Box002" as default names, respectively. These names can be changed by the user.

Next, by selecting the "MOUSE: LINK MODE" of the "EDIT" menu, or selecting the "LINK MODE" button in the tool bar, the mouse operation is switched to a link mode. By operating the mouse, boxes having a sequential relationship in scenario are linked to each other.

Figure 10:
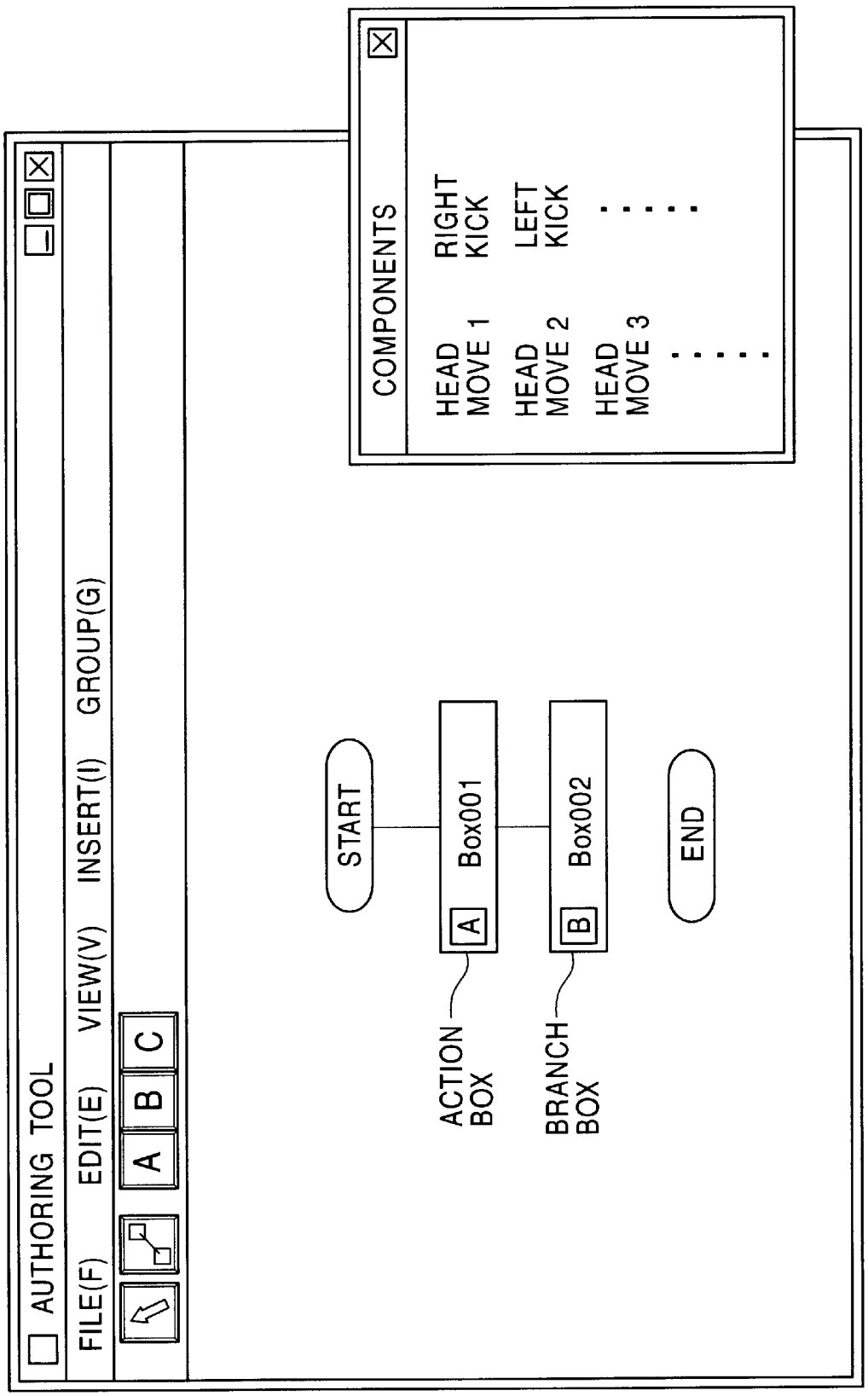
FIG. 10 is an illustration showing that a start box is linked to the action box A and the action box A is linked to the branch box B on the editing window shown in FIG. 9.

FIG. 10 shows that in the editing window in FIG. 9, the "START" box is linked to the action box A and the action box A is linked to the branch box B.

Concerning a link on the branch box B when linking boxes, the user may specify conditions in accordance with instructions in a dialog box (not shown) for specifying branch conditions because the box is automatically opened. However, the specification of the branch conditions cannot be delayed, and linking is not performed until the conditions are completely specified.

By double-clicking the left button of the mouse when the cursor is positioned on a box, the user can open a dialog box for specifying a detailed processing operation of the box. When the user double-clicks on a group box, the group is opened as another editing window, as described later.

In this embodiment, the processing operation of each box is described in an assembler-like mnemonic code called "RCODE". The RCODE is a program language developed for controlling the robot 1 with simple commands. Details of the RCODE is described later.

Figure 11:
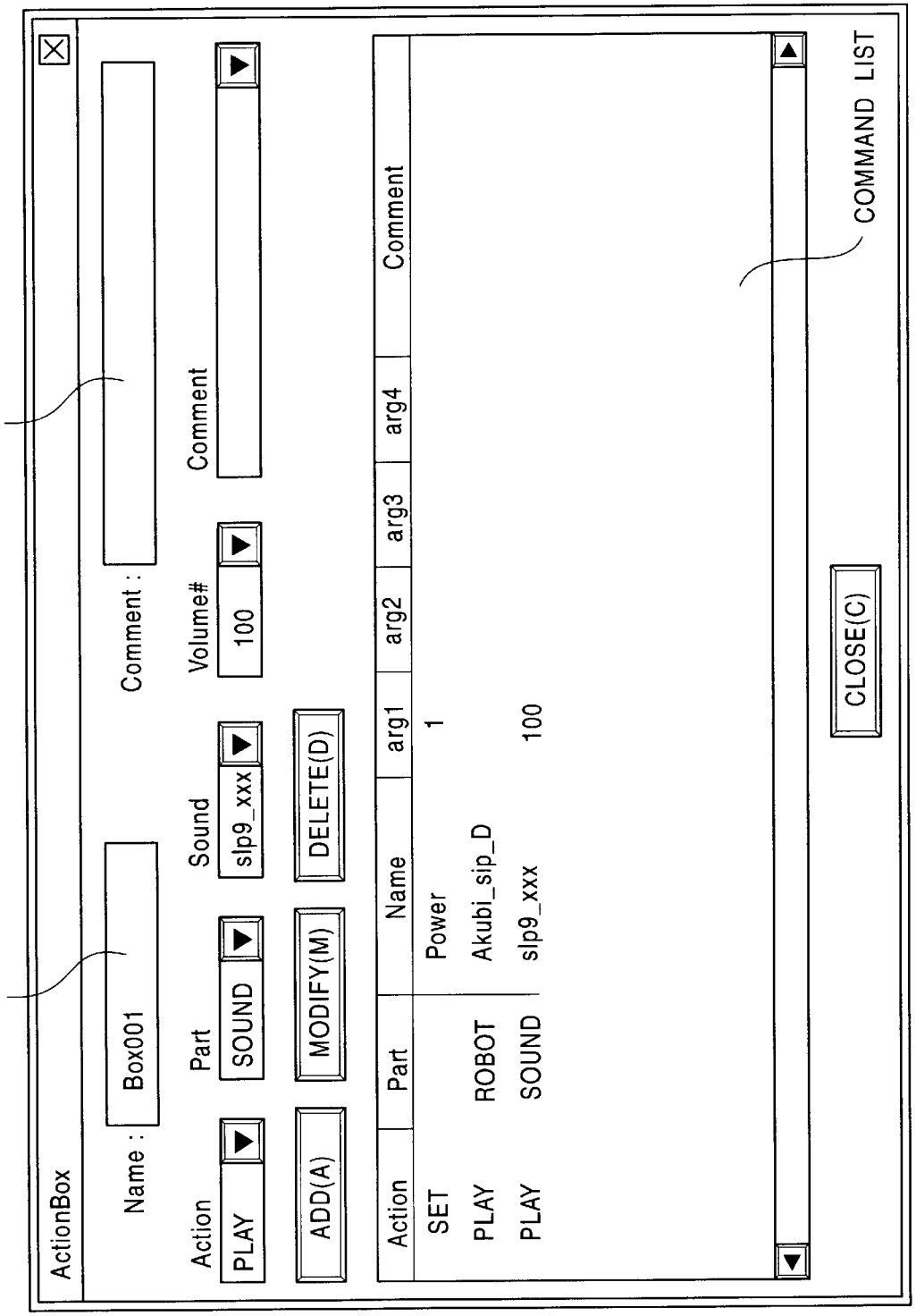
FIG. 11 is an illustration of a dialog box for designating details of an action box.

FIG. 11 illustrates a dialog box for specifying details of an action box. This dialog box can be called by double-clicking on the desired action box A in the editing window in FIG. 9 or FIG. 10.

The user can specify the name of the action box by entering a string of characters in a name field in a dialog box as shown in FIG. 11. The user can also enters comments on the action box in a comment field.

An RCODE command corresponding to one line or one step can be set by directly entering an RCODE command name and command parameters in combo boxes such as "Action", "Part", "Sound", and "Volume#", or selecting a desired command or a command parameter from a list box (not shown) displayed when the inverted triangular button at the right end of each combo box is pressed.

By using the combo boxes such as "Action", "Part", "Sound", and "Volume#", an RCODE command corresponding to one step is set, and by clicking on the "ADD (A)" button, the set command is sequentially registered on a command list.

After selecting a predetermined line on this command list, by clicking on the "MODIFY" (M) button, the selected line is treated as a line to be modified, and the set contents are displayed in the combo boxes such as "Action", "Part", "Sound", and "Volume#". Also, after selecting a predetermined line on the command list, by clicking on the "DELETE (D)" button, the selected line is deleted from the command list.

After completing, in the dialog box, the specification of the details of the action box, by clicking on the "CLOSE (C)" button, the contents specified through the screen are registered as a processing routine described in RCODE and the dialog box is closed.

Figure 12:
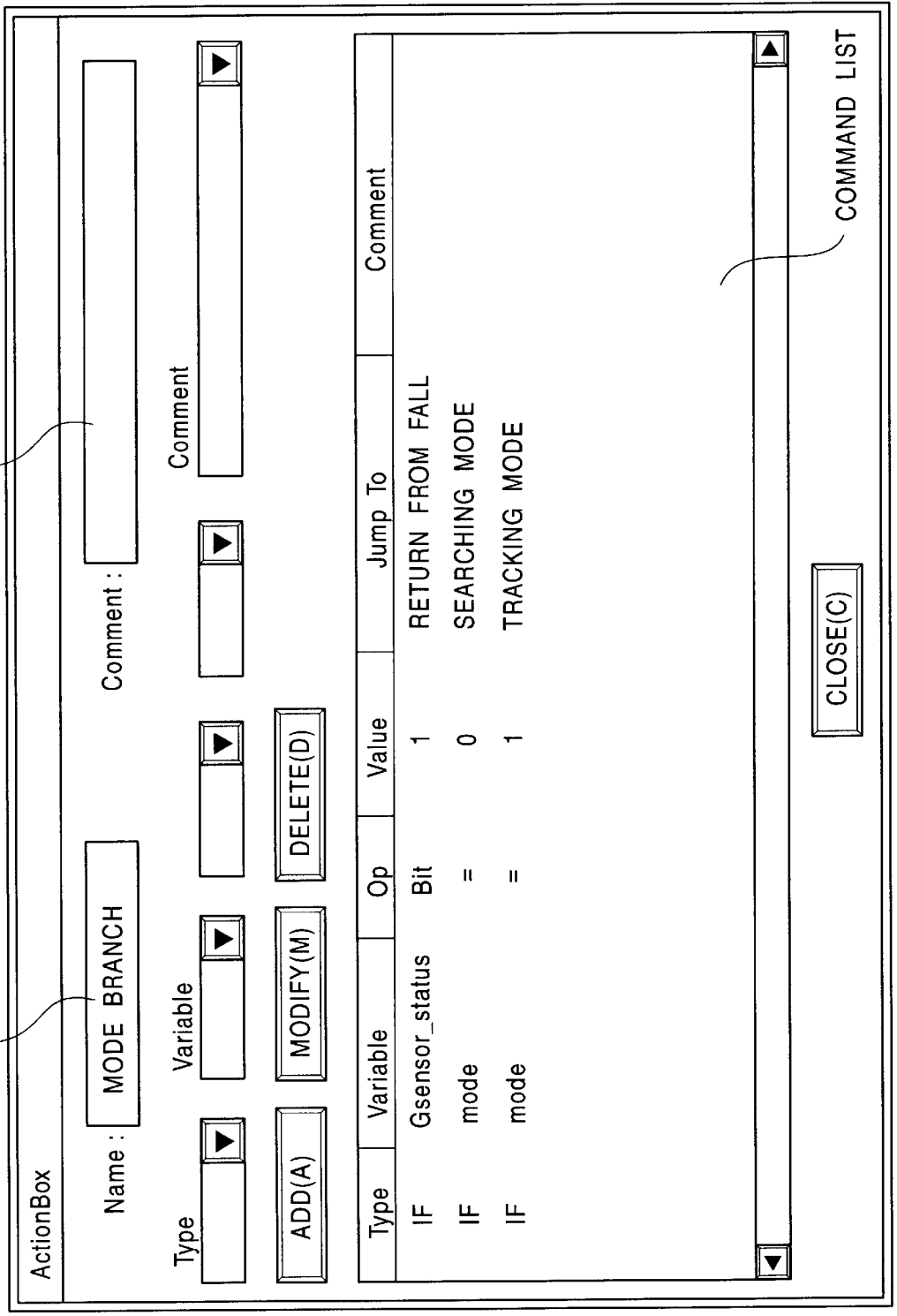
FIG. 12 is an illustration of a dialog box for designating details of a branch box.

FIG. 12 illustrates a dialog box for specifying the details of the branch box. This dialog box can be called by double-clicking on a desired branch box B in the editing window shown in FIG. 9 or FIG. 10.

The user can specify the name of a branch box by entering a string of characters in a name field in the dialog box shown in FIG. 12. In the illustrated example, "MODE BRANCH" is entered as the name of the branch box. Comments on the branch box can also be entered in a comment field.

In addition, by directly entering an RCODE command name or command parameters in combo boxes such as "Type" and "Variable", or selecting a desired command or command parameters from a list box (not shown) displayed when the inverted triangular button at the right end of each combo box is pressed, an RCODE command that describes condition determination can be set.

By using the combo boxes such as "Type" and "Variable" to set the RCODE command for branch conditions, and clicking on the "ADD (A)" button, the set command is sequentially registered on a command list.

After selecting a predetermined line on this command list, by clicking on the "MODIFY (M)" button, the line is treated as a line to be modified, and the set contents are displayed in the combo boxes such as "Type" and "Variable". After selecting a predetermined line on the command list, by clicking on the "DELETE (D)" button, the selected line can be deleted from the command list.

After completing the specification of the branch box in the dialog box, by clicking on the "CLOSE (C)" button, the specified contents are registered as a processing routine described in RCODE and the dialog box is closed.

The user does not always need to set details of each box by using a dialog box as shown in FIG. 11 or FIG. 12. In a component window (see FIG. 6) on a GUI screen provided by the authoring tool, action boxes and branch boxes whose details have been specified are prepared as components. Accordingly, by dragging and dropping a desired component box from the component window to the editing window, the user can directly use the component as a part of a program.

On the GUI screen provided by the authoring tool, by right-clicking the right button of the mouse when the cursor is positioned on a box, a "context menu" (not shown) appears. From the context menu, deletion of a box and deletion of a link can be performed.

Nevertheless, it is impossible to directly instruct deletion of a particular line linking boxes by directly designating the particular line. For deleting a line, the context menu must always be used. In the case of the branch box, a dialog box (not shown) is displayed which includes a list box for selecting which link should be deleted. The user can click on a "deletion" button for selecting a link which should be deleted from the list.

By using the GUI screen of the above authoring tool, the user can create a program that describes, for example, a scenario in which the robot 1 plays a soccer game, that is, an action procedure. This type of scenario is described in an arrangement of boxes as shown in FIG. 13.

Figure 13:
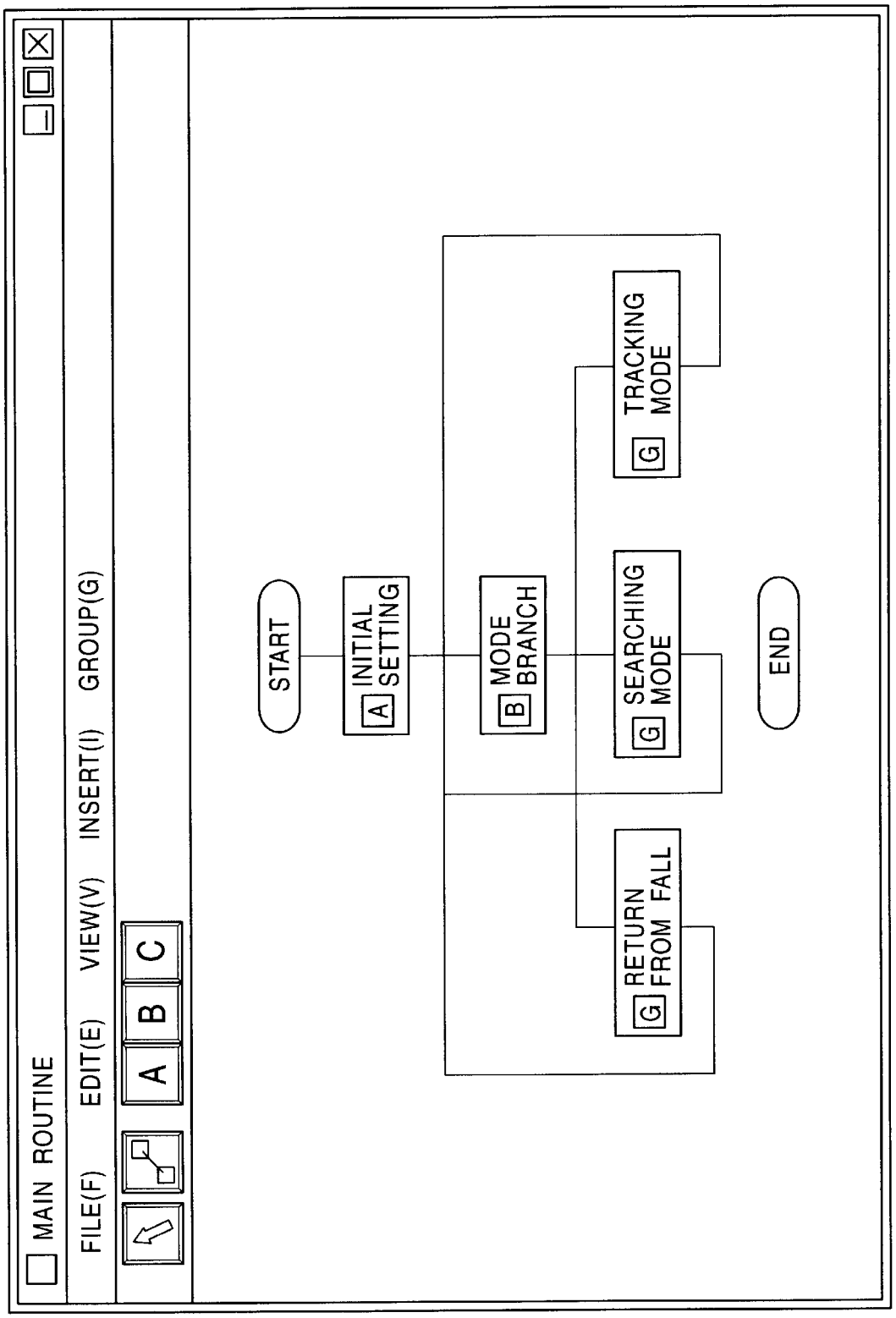
FIG. 13 is an illustration of a GUI screen on which a scenario used for the robot shown in FIG. 1 to play a soccer game is created.

In the example shown in FIG. 13, after initial setting of the robot 1 is performed by using details designated in the action box "INITIAL SETTING", the robot 1 executes an action mode among the action modes, "RETURN FROM FALL", "SEARCHING MODE", and "TRACKING MODE", in accordance with the result of comparison between conditions specified in the branch box "MODE BRANCH" and the designated initial settings.

Figure 14:
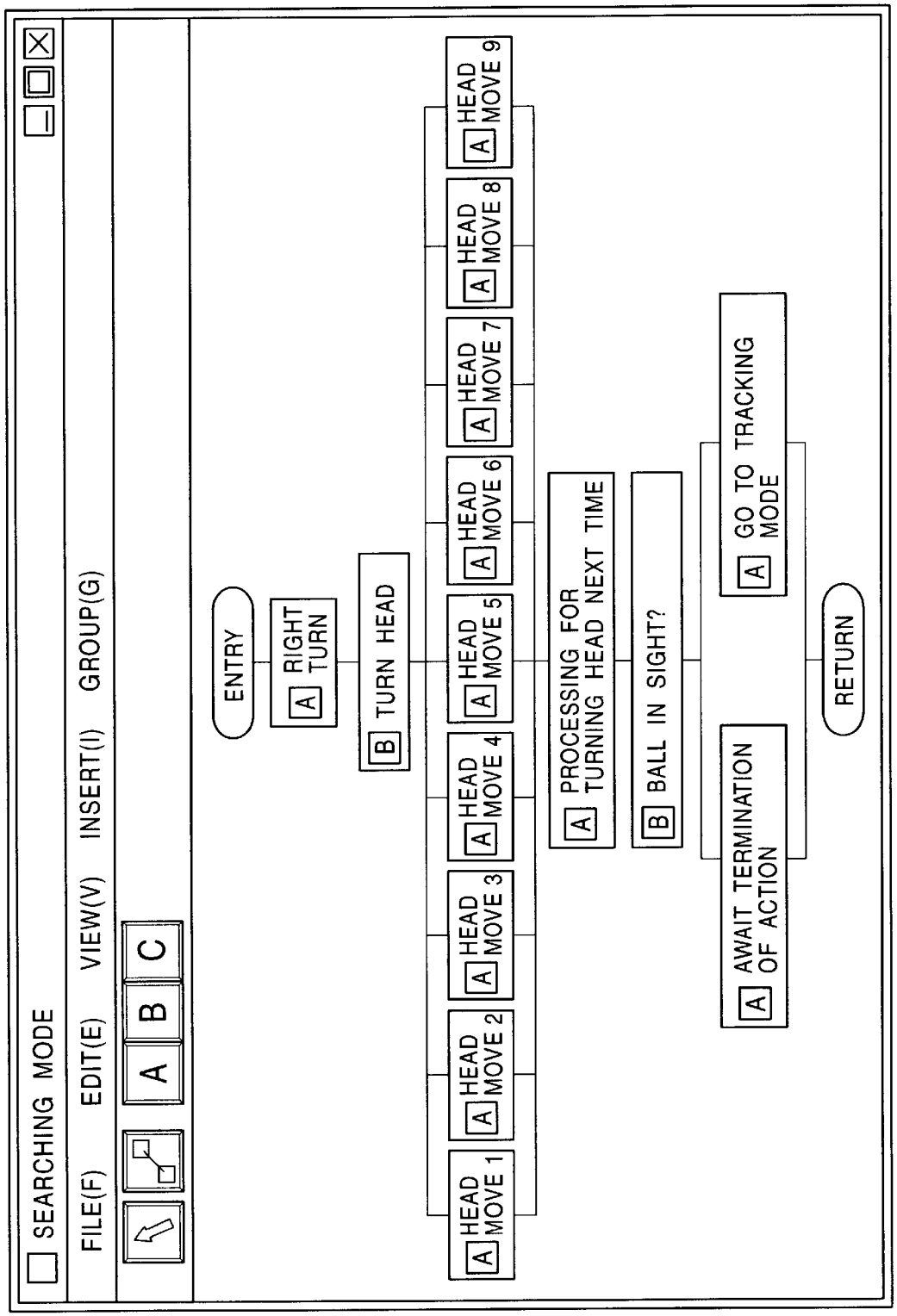
FIG. 14 is an illustration of a screen on which the group box "SEARCHING MODE" in the soccer-game scenario shown in FIG. 13 is opened as an editing window.
Figure 15:
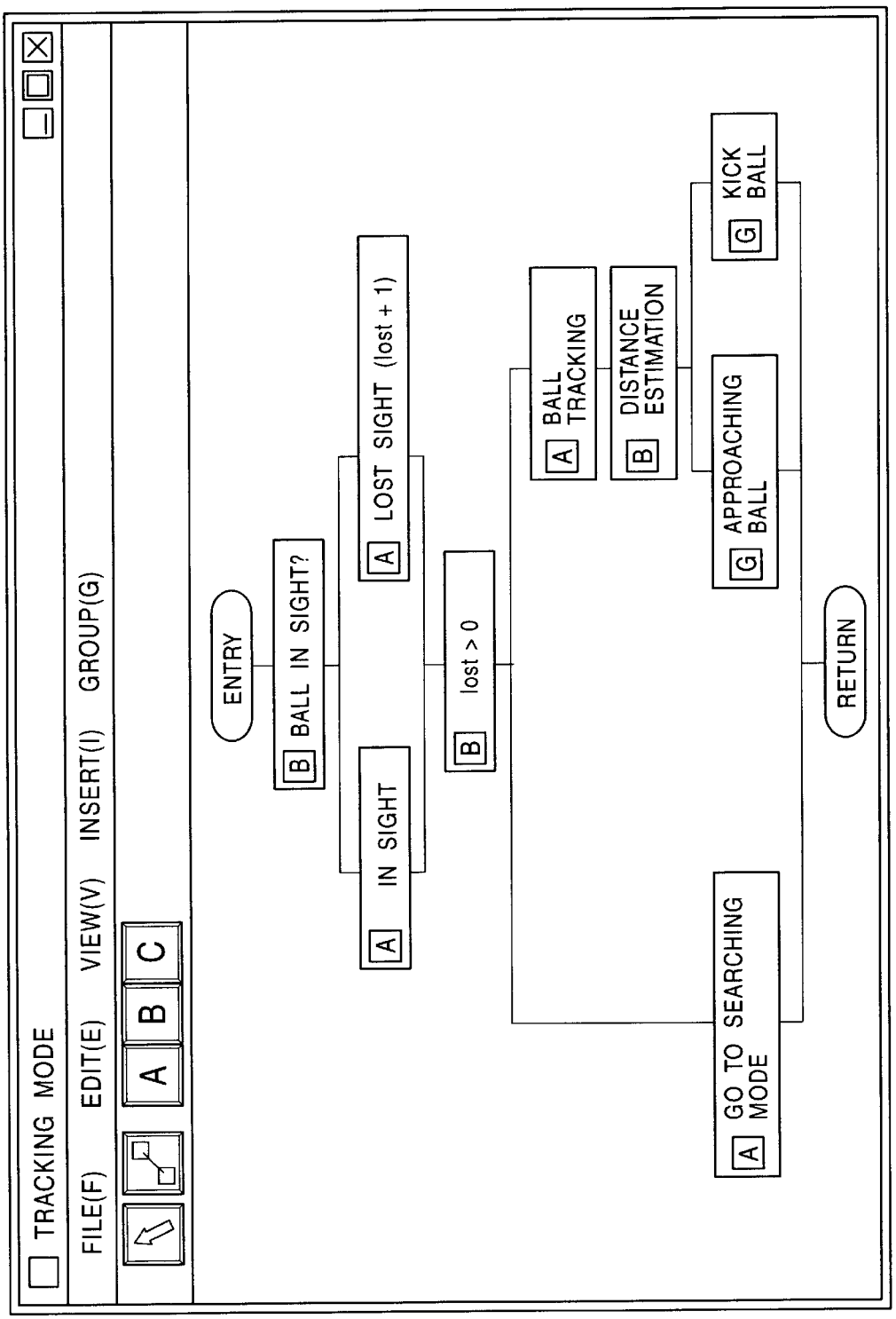
FIG. 15 is an illustration of a screen on which the group box "TRACKING MODE" in the soccer-game scenario shown in FIG. 13 is opened as an editing window.

Each of "RETURN FROM FALL", "SEARCHING MODE", and "TRACKING MODE" is described as a group box. As described above, when double-clicking on a group box in the editing window, the group is opened as another editing window. FIG. 14 illustrates an editing window for a searching mode which appears when the user double-clicks on "SEARCHING MODE". FIG. 15 illustrates an editing window for a tracking mode which appears when the user double-clicks on "TRACKING MODE".

As already described, in this embodiment, processing actions of the robot 1 is described in a mnemonic code called. "RCODE" such as an assembler. Here, details of RCODE are described below.

RCODE is a programming language developed for controlling the robot 1 with simple commands, and can be used as a robot-controlling minimum-level script language since it has basic control constructions such as IF and GO.

In RCODE, all capital words are reserved for constant names and are not allowed to be used as variable names prepared by users.

RCODE has operators for designating actions that must be executed, such as control, jump, branch, assignment, synchronization, and functions. The following is a list of RCODE operators.

<<control>>

| | |
|---|---|
| EDIT | To go to the editing mode (code transfer through a serial line). |
| RUN | To initiate execution. |
| END | To terminate the editing mode/to terminate execution. |
| LOAD:<filename> | To read a code in the Memory Stick into the memory. |
| SAVE:<filename> | To write a code in the memory into the Memory Stick. |

<<jump>>

| | |
|---|---|
| :<label> | Represents a label definition. <label> is a numerical value equal to 1 or greater (zero (0) represents the next line). |
| GO:<label> | To jump to the label. |

<<branch>>

IF:<op>:<var1>:<const>|<var2>:<then_label>[:<else_label>]

To branch after comparing variable 1 <var1> and a constant <const> or variable 2 <var2>.

<op> has six types, "=", "< >", "<", "<=", ">", and ">=".

SWITCH:<var>

To set the value of a variable as a context value.

CSET:<op>:<var1>|<const1>:<var2>|<const2>:<var3>|<const3>

To use the operator <op> to compare value 1 and value 2, and to set value 3 as a context value if the result of comparison is true.

When CSET commands consecutively appear, CSET commands which appear after a CSET command is true are treated as No Operation (cascaded command).

CASE:<const>:<RCODE command>

To execute <RCODE command> if a context value is equal to <const>.

<<assignment>>

LET:<var1>:<const>|<var2>  <var1>←<const>|<var2>

To assign a value to a variable.

SET:<var1>:<const>|<var2>  <var1>←<const>|<var2>

A special function works depending on a variable. (Not simple assignment)

GET:<var1>

To display the content of <var1>(for debugging).

<<operations>>

| | | |
|---|---|---|
| ADD:<var1>:<const>|<var2> | <var1>←<var1>+<const>|<var2> | addition |
| SUB:<var1>:<const>|<var2> | <var1>←<var1>−<const>|<var2> | subtraction |
| MUL:<var1>:<const>|<var2> | <var1>←<var1>*<const>|<var2> | multiplication |
| DIV:<var1>:<const>|<var2> | <var1>←<var1>/<const>|<var2> | division |
| MOD:<var1>:<const>|<var2> | <var1>←<var1>%<const>|<var2> | remainder |
| AND:<var1>:<const>|<var2> | <var1>←<var1>&<const>|<var2> | logical multiplication |
| IOR:<var1>:<const>|<var2> | <var1>←<var1>|<const><var2> | logical addition |
| XOR:<var1>:<const>|<var2> | <var1>←<var1>^<const><var2> | exclusive |

| | | logical addition |
|---|---|---|
| RND:<var1>:<from>:<to> | <var1>←uniform random numbers in a range of <from> to <to> | |

<<synchronization>>

| | |
|---|---|
| WAIT | To await the termination of a proximately operation (the termination of reproduction). |
| WAIT:<ms> | To wait for only milliseconds of an argument. <ms> = 1 to 30000. (Note: resolution is 32 [ms]) |
| WAIT:SOUND | To await the termination of a sound replay (This alone can be used for determination during the sound replay). |
| WAIT:LIGHT | To await the termination of a light replay (This alone can be used for determination during the light replay). |

<<functions>>

| | |
|---|---|
| CALL:<label> | To call a subroutine of <label>. The number of nests is a maximum of 16. Parameter transfer is substituted by using variables. |
| RETURN | To return from a subroutine. It is necessary to pay attention to nest matching since stack pointers have no checks. |

Among the RCODE commands, commands that control the action of the robot 1 are broadly divided into the following five basic types:

| | | |
|---|---|---|
| (1) POSE | To control the robot 1 to be in a posture (motion-starting posture). | |
| (2) MOVE | To control the robot 1 to make a motion. This corresponds to OMNE/OMTE/OMLE2_S/OMSE. | |
| (3) PLAY | To control the robot 1 to replay a motion. This corresponds to OAllReplay/OHeadReplay/OLegsReplay/OTailReplay. | |
| (4) STOP | To control the robot 1 to stop an action (after stopping the present motion). | |
| (5) QUIT | To control the robot 1 to urgently stop an action (immediately). | |

It may be said that MOVE and PLAY are similar functions in that each controls the robot 1 to "perform an action" except for a difference in that MOVE controls the robot 1 to perform an embedded action and PLAY controls the robot 1 to perform an action defined in the file "*.mtn" in a Memory Stick. The action by MOVE is not customized since it is embedded, but detailed parameter designation, etc., can be performed. Conversely, the action by PLAY can be replaced since it is a replay of the file "*.mtn" although parameter designation cannot be performed.

The following is a list of the RCODE commands.

| | |
|---|---|
| SET:ROBOT:POWER:1 | Switch on the main power supply. |
| SET:ROBOT:POWER:0 | Switch off the main power supply. |
| GET:ROBOT | Dump all variables. |
| GET:ROBOT:<var> | Get a variable. |
| SET:ROBOT:<var>:<value> | Set all variables. |
| POSE:ROBOT:<motion_name> | To the motion-starting pose. |
| POSE:LEGS:<motion_name> | To the motion-starting pose. |

-continued

| | |
|---|---|
| POSE:HEAD:<motion_name> | To the motion-starting pose. |
| POSE:TAIL:<motion_name> | To the motion-starting pose. |
| PLAY:ROBOT:<motion_name> | Replay a motion. |
| PLAY:LEGS:<motion_name> | Replay a motion. |
| PLAY:HEAD:<motion_name> | Replay a motion. |
| PLAY:TAIL:<motion_name> | Replay a motion. |
| PLAY:SOUND:<sound_name>:<volume> volume = 0 to 100 | Replay sound. |
| PLAY:LIGHT:<pattern_name>:<times> times = 0 to 16 (0: default; 16: loop) | Replay light (LED pattern). |
| MOVE:ROBOT:<motion_name> | Replay an OMLE-embedded action. (return from a fall, etc.) |
| MOVE:LEGS:WALK:<style1>:<dir>:<times> | Walk. |
| MOVE:LEGS:STEP:<style1>:<dir>:<times> | Walk (StepWalk). |
| MOVE:LEGS:STEP:<style1>:<deg> style1 = 0 to 10, 12(R-Turn), 13(L-Turn) style2 = 14(R-Kick), 15(L-Kick) dir = 1 to 6 times = 0 to 9999 deg = −90 to 90 | Kick. |
| MOVE:HEAD:HOME | Move to the home position of the head unit. |
| MOVE:HEAD:ABS:<tilt>:<pan>:<roll>:<time> | Perform an absolute positional move of the head unit. |
| MOVE:HEAD:REL:<tilt>:<pan>:<roll>:<time> | Perform a relative positional move of the head unit. |
| MOVE:HEAD:C-TRACKING | Color tracking of the head unit. |
| MOVE:HEAD:C-TRACKING:<time> tilt = −180 to 180 pan = −180 to 180 roll = −180 to 180 time = 0 to 99999 [ms] | Color tracking of the head unit. |
| MOVE:TAIL:HOME | Move to the home position of the tail unit. |

-continued

| | |
|---|---|
| MOVE:TAIL:ABS:<tilt>:<pan>:<time> | Perform an absolute positional move of the tail unit. |
| MOVE:TAIL:SWING:<tilt>:<pan>:<time><br>tilt = −90 to 90<br>pan = −90 to 90<br>time = 0 to 99999 [ms] | Swing the tail unit. |
| STOP:ROBOT | Normally stop the entirety. |
| STOP:LEGS | Normally stop the four legs. |
| STOP:HEAD | Normally stop the head unit. |
| STOP:TAIL | Normally stop the tail unit. |
| STOP:SOUND | Stop a sound replay. |
| STOP:LIGHT | Stop a light replay. |
| QUIT:ROBOT | Urgently stop the entirety. |
| QUIT:LEGS | Urgently stop the four legs. |
| QUIT:HEAD | Urgently stop the head unit. |
| QUIT:TAIL | Urgently stop the tail unit. |
| QUIT:SOUND (equivalent to STOP:SOUND) | Stop a sound replay. |
| QUIT:LIGHT (equivalent to STOP:LIGHT) | Stop a light replay. |

In the RCODE, system variables are defined for instructing actions and control values for the parts of the robot 1 and for obtaining the condition of the parts (reading of sensor-output values, etc.). The following is a list of system variables in the RCODE.

| | |
|---|---|
| Power | Power supply 0: OFF; 1: ON |
| Head_tilt | First head-unit-joint angle [°] |
| Head_pan | Second head-unit-joint angle [°] |
| Head_roll | Third head-unit-joint angle [°] |
| Head_mouth | Head-unit-jaw angle [°] |
| Tail_1 | First tail-unit-joint angle [°] |
| Tail_2 | Second tail-unit-joint angle [°] |
| Leg_RF_1 | First front-right-joint angle [°] |
| Leg_RF_2 | Second front-right-joint angle [°] |
| Leg_RF_3 | Third front-right-joint angle [°] |
| Leg_LF_1 | First front-left-joint angle [°] |
| Leg_LF_2 | Second front-left-joint angle [°] |
| Leg_LF_3 | Third front-left-joint angle [°] |
| Leg_RR_1 | First rear-right-joint angle [°] |
| Leg_RR_2 | Second rear-right-joint angle [°] |
| Leg_RR_3 | Third rear-right-joint angle [°] |
| Leg_LR_1 | First rear-left-joint angle [°] |
| Leg_LR_2 | Second rear-left-joint angle [°] |
| Leg_LR_3 | Third rear-left-joint angle [°] |
| Head_sw | Head-unit pressure sensor [$10^n$ − 3Pa] |
| Distance | Head-unit obstacle sensor [mm] |
| Leg_RF_sw | Front-right-leg-muscle spherical sensor [On: −1; Off: 0] |
| Leg_LF_sw | Front-left-leg-muscle spherical sensor [On: −1; Off: 0] |
| Leg_RR_sw | Rear-right-leg-muscle spherical sensor [On: −1; Off: 0] |
| Leg_LF_sw | Rear-left-leg-muscle spherical sensor [On: −1; Off: 0] |
| Gsensor_status | G-sensor status (16-bit flag) |
| Gsensor_roll | G-sensor roll angle [°] |
| Gsensor_pitch | G-sensor pitch angle [°] |
| Gsensor_yaw | G-sensor yaw angle [°] |
| Cdt_npixel | The number of color-sensor pixels |
| Psd_status | Obstacle-sensor status |
| Psd_range | Distance to an obstacle |
| Touch_head | head-unit touch sensor |
| Touch_head_time | head-unit-touch-sensor pressed time |
| Touch_head_press | head-unit-touch-sensor average pressure [unit unknown] |
| Touch_RF | Front-right-muscle spherical sensor Detection of ON-to-OFF/OFF-to-ON |
| Touch_LF | Front-left-muscle spherical sensor Detection of ON-to-OFF/OFF-to-ON |
| Touch_RR | Rear-right-muscle spherical sensor Detection of ON-to-OFF/OFF-to-ON |
| Touch_LR | Rear-left-muscle spherical sensor Detection of ON-to-OFF/OFF-to-ON |
| Tone_num | Detection of a tone (sound number) |
| Tone_level | The volume of sound |
| Tone_dir | Detection direction |
| Melody_id | Detection of a melody (melogy ID) |
| Melody_num | The number of tones (1 to 3) |
| Tone1_num | The sound number of Tone 1 |
| Tone1_level | The volume of Tone 1 |
| Tone1_dir | The direction of detection of Tone 1 |
| Tone2_num | The sound number of Tone 2 |
| Tone2_level | The volume of Tone 2 |
| Tone2_dir | The direction of detection of Tone 2 |
| Tone3_num | The sound number of Tone 3 |
| Tone3_level | The volume of Tone 3 |
| Tone3_dir | The direction of detection of Tone 3 |
| Sound_status | Detection of sound (status) |
| Sound_num | Sound number |
| Sound_level | The volume of sound |
| Sound_dir | The direction of detection |
| Sound_busy | 1: sound is being replayed; 0: no sound |
| Light_busy | 1: light is being replayed; 0: no light |

Among the above system variables, Gsensor_status consists of a 16-bit flag. The meanings of the bits are shown in the following table.

TABLE 1

| Bit | OMGsensor Status | Description |
|---|---|---|
| 0x0001 | FALL_DOWN_FRONT | Fall (front side) |
| 0x0001 | FALL_DOWN_RIGHT | Fall (right side) |
| 0x0001 | FALL_DOWN_LEFT | Fall (left side) |
| 0x0001 | FALL_DOWN_REAR | Fall (rear side) |
| 0x0002 | HOLD_UP | Hold up |
| 0x0004 | HOLD_DOWN | Hold down |
| 0x0400 | GET_UP | Return from a fall |
| 0x0800 | JOINT_DANGER | Insertion to a joint |
| 0x1000 | JOINT_GAIN_ENABLED | Gain ON |
| 0x2000 | JOINT_GAIN_DISABLED | Gain OFF |

The system variable Sound_status indicates the status of input of sound to the robot 1 by using the values of the following table.

TABLE 2

| Sound_status | Status | Description |
|---|---|---|
| 0 | omtonePEAK | Sound having a peak. |
| 1 | omtoneNOPEAK | Sound having no peak. |
| 2 | omtoneNOPOWER | Small volume. |
| 3 | omtoneCALC | Calculation is being performed. |
| 4 | omtoneOVERFLOW | Overflow. |

The RCODE provides a service which logs (temporarily stores in a predetermined area of the memory) data output from sensors provided in the parts of the robot 1. Specifically, the start of logging can be instructed by the RCOSE "LOG:START" and the end of the logging can be instructed by the RCODE command "LOG:END". Also, by using the variable "Log_n", the number of stored logs can be displayed.

In addition, by using the RCODE command "LOG:PCFILE:<file>", a log can be stored in a file in the host computer 100 so as to have a designated file name. Similarly, by using the RCODE command "LOG:MSFILE:<file>", a file can be stored in a file in the Memory Stick so as to have a designated file name.

Data output from each sensor may be sequentially output and directly printed by a printer without being stored in a memory or file. In this case, by using the RCODE command "LOG:PRINT: <s>:<t>:<i>", the output form can be specified, where s represents a sensor number (see the following Table 3), t represents a value type (see the following Table 4), and i represents an index (0 to Log n−1). By using the RCODE command "LOG:PRINT:CRLF", line-feeding can be instructed. By using the RCODE command "LOG:PRINT:EOF", file-closing can be instructed.

TABLE 3

| s | Sensor | Description |
|---|---|---|
| 0 | Head Tilt | PRM:/r0/c0-Joint:j0 |
| 1 | Head Pan | PRM:/r0/c0/c1-Joint:j1 |
| 2 | Head Roll | PRM:/r0/c0/c1/c2-Joint:j2 |
| 3 | Mouth | PRM:/r0/c0/c1/c2/c3-Joint:j3 |
| 4 | Tail 1 | PRM:/r1/c0-Joint:j0 |
| 5 | Tail 2 | PRM:/r1/c1-Joint:j1 |
| 6 | Leg FR 1 | PRM:/r2/c0-Joint:j0 |
| 7 | Leg FR 2 | PRM:/r2/c0/c1-Joint:j1 |
| 8 | Leg FR 3 | PRM:/r2/c0/c1/c2-Joint:j2 |
| 9 | Leg FL 1 | PRM:/r3/c0-Joint:j0 |
| 10 | Leg FL 2 | PRM:/r3/c0/c1-Joint:j1 |
| 11 | Leg FL 3 | PRM:/r3/c0/c1/c2-Joint:j2 |
| 12 | Leg RR 1 | PRM:/r4/c0-Joint:j0 |
| 13 | Leg RR 2 | PRM:/r4/c0/c1-Joint:j1 |
| 14 | Leg RR 3 | PRM:/r4/c0/c1/c2-Joint:j2 |
| 15 | Leg RL 1 | PRM:/r5/c0-Joint:j0 |
| 16 | Leg RL 2 | PRM:/r5/c0/c1-Joint:j1 |
| 17 | Leg RL 3 | PRM:/r5/c0/c1/c2-Joint:j2 |
| 18 | Head Press | PRM:/r0/c0/c1/c2/c3-Sensor:t3 |
| 19 | Distance | PRM:/r0/c0/c1/c2/p3-Sensor:p3 |
| 20 | Acc 1 | PRM:/acc0-Sensor:a0 |
| 21 | Acc 2 | PRM:/acc1-Sensor:a1 |
| 22 | Acc 3 | PRM:/acc2-Sensor:a2 |
| 23 | Gyro 1 | PRM:/gyro0-Sensor:g0 |
| 24 | Gyro 2 | PRM:/gyro1-Sensor:g1 |
| 25 | Gyro 3 | PRM:/gyro2-Sensor:g2 |
| 26 | Thermo 1 | PRM:/thermo0-Sensor:th0 |
| 27 | Thermo 2 | PRM:/thermo1-Sensor:th1 |
| 28 | Button FR | PRM:/r2/c0/c1/c2/c3-Sensor:sw3 |
| 29 | Button FL | PRM:/r3/c0/c1/c2/c3-Sensor:sw3 |
| 30 | Button RR | PRM:/r4/c0/c1/c2/c3-Sensor:sw3 |
| 31 | Button RL | PRM:/r5/c0/c1/c2/c3-Sensor:sw3 |

TABLE 4

| t | Constant Name | Actual Member |
|---|---|---|
| 0 | VALUE | OSensorValue.value |
| 1 | SIGNAL | OSensorValue.signal |
| 2 | PWM | OjointValue.pwmDuty |

As described above, when the scenario for controlling the action of the robot 1 is created and edited by using the authoring tool in this embodiment, it is automatically converted into the RCODE for realizing the edited scenario. For example, by using the RCODE, an action-control program for the soccer game having a main routine generated in a GUI screen as shown in FIG. 13 is described as follows:

SETV:ROBOT:POWER:1
SET:Trace:1
SET:mode:0 // 0:SEARCH MODE 1:TRACKING MODE
SET:head:0 // COUNTER FOR TURNING THE HEAD IN SEARCH MODE
SET:lost:0 // NUMBER OF TIMES SIGHT OF THE BALL IS LOST
:100 // MainLoop
SET: stat:Gsensor_status
AND:stat:1
IF:=:stat:1:9000 // FELL?
IF:=:mode:0:1000 // TO SEARCH MODE
IF:=:mode:1:2000 // TO TRACKING MODE
GO:100
:1000 // mode:0 SEARCH MODE
SET:mode:0
MOVE:LEGS:STEP:RIGHT_TURN:0:4 // SEARCH FOR THE BALL WHILE TURNING RIGHT
SWITCH:head //PROCESSING FOR TURNING THE HEAD
CASE:0:MOVE:HEAD:ABS:−15:0:0:500
CASE:1:MOVE:HEAD:ABS:−15:−40:0:500
CASE:2:MOVE:HEAD:ABS:−15:−80:0:500
CASE:3:MOVE:HEAD:ABS:−45:−40:0:500
CASE:4:MOVE:HEAD:ABS:−45:0:0:500
CASE:5:MOVE:HEAD:ABS:−45:40:0:500
CASE:6:MOVE:HEAD:ABS:−45:80:0:500
CASE:7:MOVE:HEAD:ABS:−15:40:0:500
CASE:8:MOVE:HEAD:ABS:−15: 0:0:500
DD:head:1 // head INCREMENTED
MOD:head:9
WAIT
IF:<Cdt_npixel:32:100 //GO TO TRACKING MODE IF THE BALL IS IN SIGHT
:2000 // TRACKING MODE
SET:mode:1
IF:<Cdt_npixel:32:100 //IS THE BALL IN SIGHT?
MOVE:HEAD:C-TRACKING:100 //START COLOR TRACKING
IF:>:Head_tilt:−58:2300 //USE THE HEAD ANGLE TO ESTIMATE DISTANCE
IF:>:Head_pan:0:2210:2220 // IF THE BALL IS NEAR, KICK!
:2210
MOVE:HEAD:HOME // SO AS NOT TO KICK THE JAW (∩∩;), A LITTLE
UNNATURAL
MOVE:LEGS:KICK:LEFT_KICK:0
MOVE:LEGS:STEP:SLOW:FORWARD:1
GO:2900
:2220
MOVE:HEAD:HOME // SO AS NOT TO KICK THE JAW (∩∩;), A LITTLE
UNNATURAL
MOVE:LEGS:KICK:RIGHT_KICK:0
MOVE:LEGS:STEP:SLOW:FORWARD:1
GO:2900
:2300 // APPROACH THE BALL BASED ON THE HEAD ANGLE
CSET:>:Head_pan:60:1
CSET:>:Head_pan:45:2
CSET:>:Head_pan:15:3
CSET:>:Head_pan:−60:4
CSET:>:Head_pan:−45:5
CSET:>:Head_pan:−15:6
CSET:=:0:0:0
CASE:0:MOVE:LEGS:STEP:SLOW:FORWARD:4
CASE:1:MOVE:LEGS:STEP:SLOW:FORWARD:4
CASE:2:MOVE:LEGS:STEP:LEFT_TURN:0:4
CASE:3:MOVE:LEGS:STEP:SLOW:LEFT:4
CASE:4:MOVE:LEGS:STEP:SLOW:LEFTFORWORD:4

```
CASE:4:MOVE:LEGS:STEP:RIGHT_TURN:0:4
CASE:6:MOVE:LEGS:STEP:SLOW:RIGHT:4
CASE:7:MOVE:LEGS:STEP:SLOW:RIGHTFORWORD:4
:2900
WAIT
GO:100
:9000 // RETURN FROM FALL
QUIT:ROBOT
MOVE:ROBOT:ReativeGU
WAIT
GO:100
```

In addition, as described with reference to FIG. 5, by using, for example, a high-level language such as C language, the authoring tool in this embodiment can create and edit the action-control program in a script form. The following is a script for realizing an action procedure and function which are equivalent to the above-described RCODE program from "SETV:ROBOT:POWER:1" to "GO:100". The script is described in accordance with the grammar of C language.

```c
//
// SOCCER GAME DESCRIBED IN SCRIPT FORM
//#define ROBOT_NEUTRAL (0 ) // NEUTRAL
//#define ROBOT_FOUND (1 ) // BALL IS FOUND
//#define ROBOT_LOST (2 ) // BALL IS LOST
//#define ROBOT_FALL (99 ) // ROBOT FELL
// PINK
//#define PinkBall (32 )
// SYSTEM VARIABLES extern int      Head_tilt, Head_roll;
    extern int      Head_pan;
    extern int      Cdt_npixel;
    extern int      Gsensor_status;

// IS THE BALL FOUND OR LOST?
int bBall=0, bBoil;
// PRESENT STATUS
int nSoccer=0;
int nLost=0; // STEP NUMBER AT THE TIME BALL IS
    LOST
// FORWARD DECLARATION OF FUNCTION
int SoccerDog(int);
void NeutralRobot( );
void FindBall( );
void SearchBall( );
void RecoveryGU( );
void NearBall( );
void KickBall( );
//
void main( void ){
    // Soccer FLAG
    int bSoccerFlag;
    int dummy=0, true=1;
    bSoccerFlag=dummy=true;
    // SWITCH ON POWER SUPPLY
    PowerOn( );
    // MAIN GROUP
    while( bSoccerFlag ){
        SOCCER DOG
        bSoccerFlag=SoccerDog(1);
    }
    // SWITCH OFF POWER SUPPLY
    PowerOff( );
}

// START SOCCER
int SoccerDog(int dummy ){
    //DIVIDE PROCESSING BY PRESENT STATUS
    switch( nSoccer ){
    case 0: //ROBOT_NEUTRAL: // NEUTRAL STATUS
        NeutralROBOT( );
        break;
    case 1: //ROBOT_FOUND // BALL IS FOUND
        FindBall( );
        break;
    case 2: //ROBOT_LOST: // BALL IS LOST
        SearchBall( );
        break;
    case 99: //ROBOT_FALL: // ROBOT FELL
        RecoveryGU( ); // RETURN-TO-FALL PROCESS-
            ING
    }
    // CONTINUE
    return 1; //FALSE;
}
// PROCESSING FOR FINDING AND APPROACHING
    THE BALL
void FindBall( void ){
    int nHead;
    nHead=Head_tilt;
    // COLOR TRACKING
    RcodeColorTracking(100);
    // USE HEAD ANGLE TO DETERMINE DISTANCE
        TO BALL
    if( nHead> -58){
        // DETECT BALL
        if (Cdt_npixel < 32){
            // BALL IS LOST
            nsoccer=2; //ROBOT_LOST;
        }
        else{
            // APPROACH BALL
            NearBall( );
        }
    }
    else{
        // KICK BALL
        KickBall( );
    }
}
// APPROACH BALL
void NearBall( void ){
    // USE HEAD ANGLE TO SET POSITION OF BALL
    if( Head_pan=0 ){
        RcodeStepWalk(0,1,4); //StepWalk(FORWARD,4);
        RcodeWait( );
        return;
    }
    if( Head_pan > 60 ){
        RcodeStepWalk(0,1,4); // StepWalk(FORWARD,4);
        RcodeWait( );
        return;
    }
    if( Head_pan > 45 ){
        RcodeStepWalk(0,13,4); // StepWalk(LEFT_TURN,
            4);
```

```
    RcodeWait( );
    return;
}
if( Head_pan> 15 ){
    RcodeStepWalk(0,5,4); // StepWalk(LEFT,4);
    Rcodewait( );
    return;
}
if( Head_pan> -60 ){
    RcodeStepWalk(0,3,4); // StepWalk(LEFTFORWARD,
        4);
    RcodeWait( );
    return;
}
if( Head_pan > -45 )}
    RcodeStepWalk(0,1,4);  // StepWalk(RIGHT_TURN,
        4);
    RcodeWait( );
    return;
}
if(Head_pan > -15 ){
    RcodeStepWalk(0,4,4); // StepWalk(RIGHT,4);
    RcodeWait( );
    return;
}
// DETECT BALL
if (Cdt_npixel > <32){
    nSoccer=2; //ROBOT_LOST
    return;
}
{
// KICK BALL
void KickBall ( void ){
    // ADJUST HEAD POSITION
    RcodeHead(0, 0, 0, 0);
    // DETERMINE LEG FOR KICK BY BALL POSITION
        TO HEAD
    if( Head_pan > 0 ){
        RcodeKick(15, 0 ); // LEFT LEG
    }else{
        RcodeKick(14, 0 ); // RIGHT LEG
    {
    // MAKE ONE STEP FOR CHANGING OVER TO
        WALKING
    RcodeStepWalk(0, 0, 1); // StepWalk(FORWARD, 1);
}
// PROCESSING FOR SEARCHING FOR BALL
void SearchBall( void ){
    // MOVE HEAD
    switch( nLost ){
    case 0:
        RcodeHead(-15, 0, 0, 500 );
        break;
    case 1:
        RcodeHead(-15, -40, 0, 500 );
        break;
    case 2:
        RcodeHead(-15, -80, 0, 500 );
        break;
    case 3:
        RcodeHead(-45, -40, 0, 500 );
        break;
    case 4:
        RcodeHead(-45, 0, 0, 500 );
        break;
    case 5:
        RcodeHead(-45, 40, 0, 500 );
        break;
    case 6:
        RcodeHead(-45, 80, 0, 500 );
        break;
    case 7:
        RcodeHead(-15, 40, 0, 500 );
        break;
    case 8:
        RcodeHead(-15, -40, 0, 500 );
    }
    break;
    //SET THE NUMBER OF STEPS
    nLost=(nLost+1)%9;
    // WALK TO RIGHT
    RcodeStepWalk(12, 1, 4);//StepWalk(RIGHT_TURN,
        4);
    // COLOR DETECTION
    if (Cdt_npixel < 32){
        nSoccer=2; //ROBOT_LOST;
    }
    else{
        // INITIALIZE nLost
        nLost=0;
        // PROCESSING FOR APPROACHING ROBOT
        nSoccer=1; //ROBOT_FOUND;
    }
}
//
// PROCESSING IN NEUTRAL CONDITION
void NeutralROBOT( void ){
    // DETECT FALL
    if (Gsensor_status & 1){
    // FALL
    nSoccer=99; //ROBOT_FALL;
    return;
    }
    // ROBOT DOES NOT FALL. DETECT THE BALL.
    if (Cdt_npixel < 32){
        // BALL IS LOST
        nSoccer=2; //ROBOT_LOST;
    }
    else{
        // BALL IS FOUND
        nSoccer=1; //ROBOT_FOUND:
    }
}
// RETURN FROM FALL
void RecoveryGU ( void ){
    // SUCCESS IN RETURN FROM FALL?
    RcodePlay("ReactiveGU");
    RcodeWait( );
    // SET PRESENT STATUS AS NEUTRAL STATUS
    nSoccer=0; //ROBOT_NEUTRAL;
}
```

As described above, the authoring tool according to this embodiment can automatically converts a script which is created and edited by the user using a text editor or the like into an RCODE-form program. Accordingly, the above-described C-language script is automatically converted into the above-described RCODE-form program code by the authoring tool according to this embodiment.

By way of example, when the host computer 100 which uses the RCODE to edit the action-processing program and the robot 1 which executes the action-processing program are linked to each other by radio data communication such as Bluetooth or IEEE 802.11b, or by another type of radio or wire-link communication means, the host computer 100 transmits the RCODE program in units of lines or steps, and the interpreter of the robot 1 can sequentially interpret and execute the RCODE program. Also, when a command is transferred, transmission data may be encrypted by the host computer 100.

In the authoring tool according to this embodiment, an editing window is prepared for the operation of editing a script described in the RCODE and a real-time debugging operation in cooperation with the robot 1. For distinction from the editing window shown in FIG. 6, this editing window is hereinafter referred to as the "script-editing window".

Figure 16:
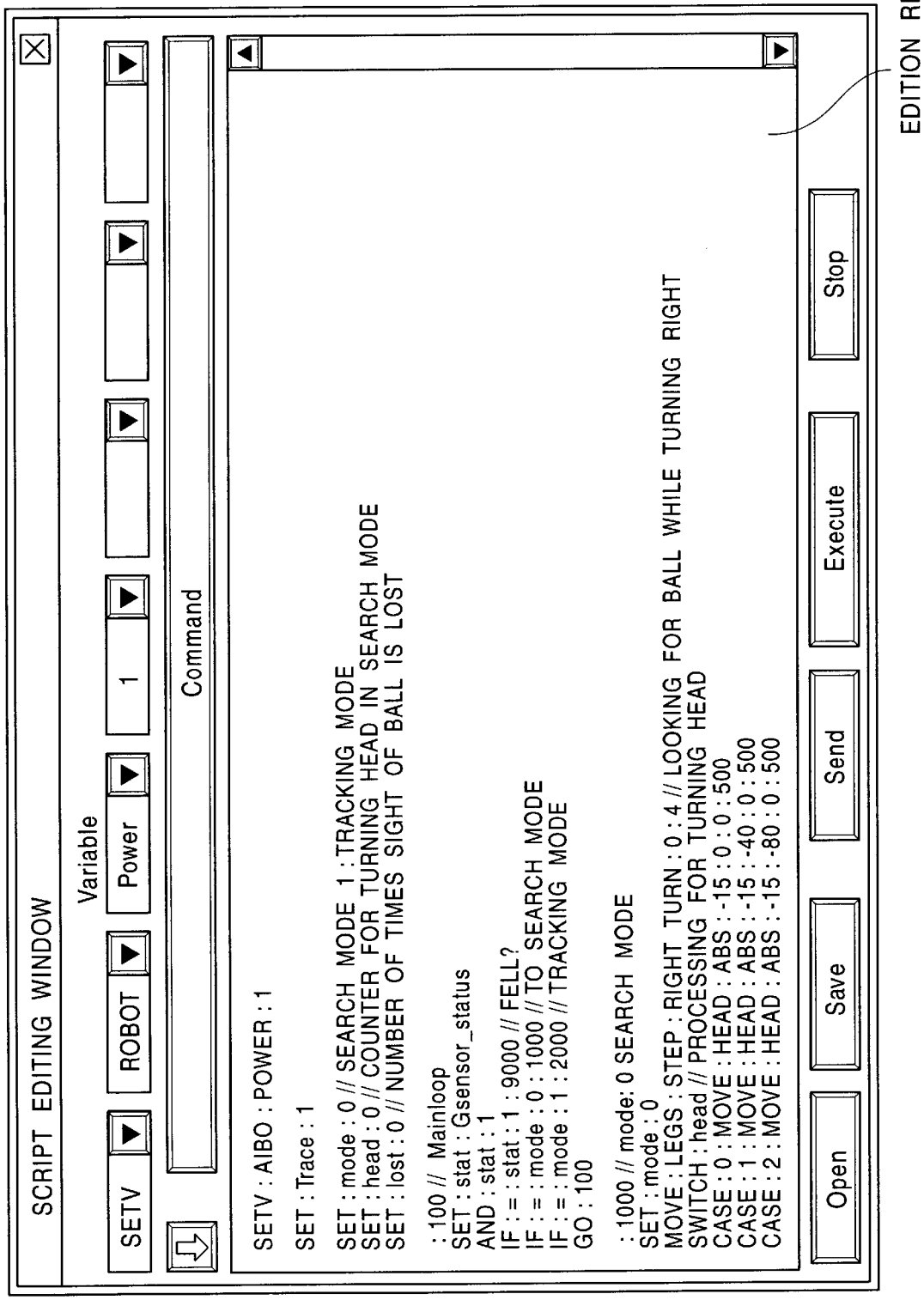
FIG. 16 is an illustration of a script-editing window provided by an authoring tool according to an embodiment of the present invention.

FIG. 16 illustrates the script-editing window.

The script-editing window includes seven combo boxes, and each command ban be designated in a hierarchical menu form. The example shown in FIG. 16 shows that a command in the first line in the editing region is designated.

When the user clicks on the "Command" button under the combo boxes, a designated command is transferred to the robot 1. Although radio data communication such as Bluetooth or IEEE 802.11b is basically used as a method of the transfer, other types of communication methods may be used. The command transfer operates asynchronously with "Execute" (described later).

When the user clicks on the downward arrwo button which is left adjacent to the "Command" button, a designated command-character string is pasted onto the lower editing region.

In the editing region provided below the "Command" button, the script can directly be edited by performing key-entry.

Further below the editing region, the "Open", "Save", "Send", "Execute", and "Stop" buttons are provided.

By using the mouse to operate the "Open" button, a desired script file, selected from a local disk in the host computer 100, can be displayed in the editing region.

By using the mouse to operate the "Save" button, the script file displayed in the editing region can be stored in a file.

By clicking on the "Send" button, the script file displayed in the editing region can be transferred to the robot 1. Although radio data communication such as Bluetooth or IEEE 802.11b is basically used as a method of the transfer, other types of communication methods may be used. However, the script is only transferred and is not directly executed in the robot 1. When the "Send" process ends, a line of "NEND" is displayed on a console window (not shown).

By clicking on the "Execute" button, the robot 1 can be instructed to initiate the execution of the transmitted script.

By clicking on the "Stop" button, the robot 1 can be instructed to abort the script which is being executed.

C. Execution/Debugging of Action Program by Robot

As described above, by clicking on the "Command" button in the script-editing window, the command in the corresponding one line can be transferred to the robot 1.

Also, by pressing the "Stop" button, the script opened in the editing region can be transferred to the robot 1. In such command transfer, it is preferable to send command data after it is encrypted.

Figure 5:
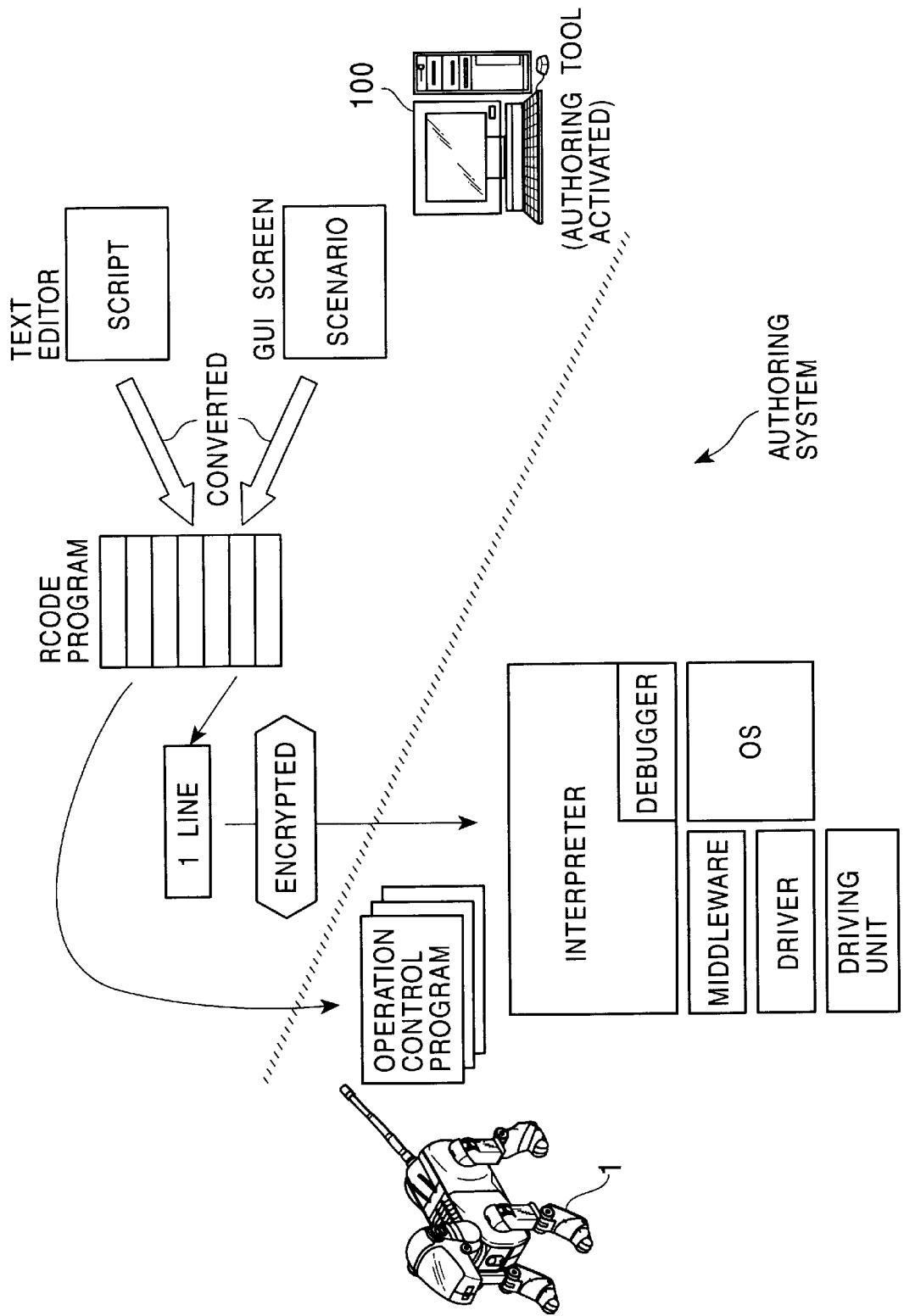
FIG. 5 is a schematic illustration of the entire structure of an authoring system according to an embodiment of the present invention.

The robot 1 has an interpreter/debugger, middleware, a driver, and an operating system (OS) which constitute an environment for executing and debugging an action-control program described in RCODE, as shown in FIG. 5.

The interpreter is a high-level-language program by which a program described in an RCODE form is read, interpreted, and executed. In a case in which an RCODE program is transmitted in an encrypted form from the host computer 100 when debugging is performed, the interpreter interprets and executes the program after performing decryption.

The debugger is a program which supports the operation of finding and correcting an error (bug) in the RCODE program. Specifically, the execution of the program can be stopped at a designated line, and the contents of the memory and variables can be referred to.

The middleware is a processing engine that performs control of walking by the robot 1 and other leg actions, processing for recognizing an image input from the camera 15, processing for recognizing sound input from the microphone 16, etc. The middleware can operate each joint actuator by using each driver and can operate other parts of hardware.

The middleware generates information (provisionally referred to as "posture-transition information") for transition to a targeted posture or a targeted action. In other words, based on behavior-instruction information supplied from an upper program such as the Interpreter, the middleware generates posture-transition information for changing the present posture or action of the robot 1 to the next posture or action (a targeted posture or action). The next posture to which the present posture can be changed is determined by physical features of the robot 1, such as the shapes of the body, each hand, and each leg, weight, the condition of connection between parts, and device configuration such as the direction and angle in which each joint bends. By considering these conditions, the middleware generates the posture-transition information.

In this embodiment, in the middleware, possible postures of the robot 1 and actions required for transition of posture are recorded beforehand in the form of, for example, a directed graph. After converting a behavior instruction sent from the upper program into posture-transition information, the middleware issues a specific action instruction to each driver.

In general, there is a case in which depending on the present posture of the robot 1, direct transition of posture in accordance with an RCODE instruction is impossible. In other words, the postures of the robot 1 is classified into postures to which the present posture can directly be changed and postures to which the present posture cannot directly be changed but can be changed through an action or posture.

For example, in the case of the quadrapedal-walking mobile robot 1 shown in FIG. 1, the robot 1 can directly change from a posture in which the robot 1 lies at full length to a posture in which the robot 1 lies down, but cannot directly change an upright posture. Accordingly, the robot 1 needs at least two-step actions in which after lying down while putting the legs close to the body, the robot 1 gets up.

In addition, there are posture transitions that cannot be executed safely (i.e., without a fall of the robot 1) without such two-step actions. For example, in the case of the quadrapedal-walking mobile robot 1 shown in FIG. 1, when the robot 1 poses for giving a cheer by raising the front legs in a standing posture, the robot 1 may fall. Also, when the robot 1 is in a lying posture as the present posture, and an instruction for the robot 1 to move the legs quickly, which is possible only in a sitting posture, is sent, if a command to control the legs quickly is issued to each joint driving element, a transition from the lying posture to the sitting posture and the action of quickly moving the legs are executed. As a result, the robot 1 loses balance and falls.

As described above, in this embodiment, in the middleware, the possible postures and actions of the robot 1 are recorded and the directed graph which links the postures by transition actions is stored. After searching the directed graph for a path from the present posture to a targeted (or designated) posture or action, based on the result of searching, a command to change the present posture to the targeted posture or action can be generated.

Figure 17:
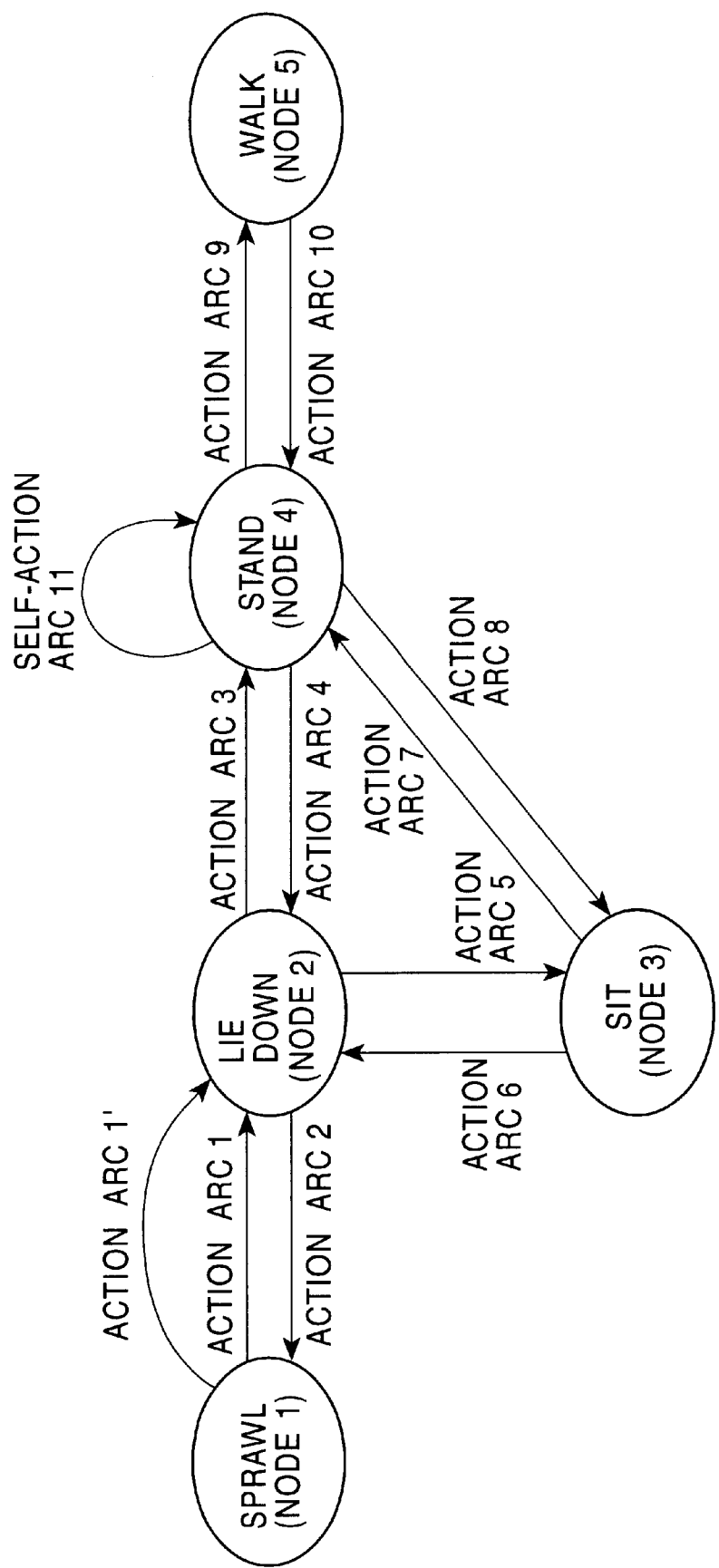
FIG. 17 is a directed graph which is stored in an RCODE-program-executing environment of the robot shown in FIG. 1 and which defines transitions of postures and actions of the robot shown in FIG. 1.

FIG. 17 illustrates a specific example of the directed graph used in this embodiment. The directed graph is composed of nodes representing possible postures of the robot 1 and directed arcs (action arcs) which each link two nodes (postures) having a transition therebetween. The example shown in FIG. 17 includes five types of nodes or postures, "SPRAWL" posture, "LIE DOWN" posture, "SIT". posture, "STAND" posture, and "WALK" posture. The directed arcs include action arcs which each represent a transition from a posture to another posture, action arcs which each represent a return from a posture to a different posture, and self-action arcs which each represent a completed action within one node. Moreover, there may be cases in which a plurality of action arcs which each represent a transition from a posture to another posture and in which a plurality of self-action arcs correspond to a posture.

When the robot 1 is in, for example, the "LIE DOWN" posture as the present posture, and an RCODE command for the robot 1 to "SIT" is input to the interpreter, a direct transition of posture is possible because as shown in FIG. 17, a directed arc exits between the node 2 (the "LIE DOWN" posture) and node 3 (the "SIT" posture). Accordingly, in accordance with an instruction sent from the interpreter, the middleware may issue a driving command to corresponding driving elements.

Conversely, when the robot 1 is in the "LIE DOWN" posture, and an RCODE command for the robot 1 to "WALK" is input to the interpreter, a directed arc which directly links node 2 (the "LIE DOWN" posture) to node 5 (the "WALK" posture) does not exist. Therefore, the middleware searches the directed graph for a path from node 2 (the "LIE DOWN" posture) to node 5 (the "WALK" posture), and forms a posture-transition plan of a transition from node 2 (the "LIE DOWN" posture) to node 5 (the "WALK" posture) via node 4 (the "STAND" posture). Based on the plan, the middleware issues a driving command to corresponding driving elements.

Summarizing the foregoing description, according to this embodiment, the middleware manages the posture-and-action transition characteristics of the robot 1, and provides a mechanism capable of absorbing differences between logical posture-and-action instructions in RCODE command level and the posture-and-action transition characteristics of hardware.

Accordingly, when ordinary users use the authoring tool to edit an action scenario for the robot 1 on a GUI screen, or describe an action-control program in the form of a script, they do not need to pay attention to detailed hardware information such as the posture-and-action transition characteristics of the robot 1. Also, in middleware level, the differences between logical posture-and-action instructions in RCODE command level and the posture-and-action transition characteristics of hardware can be absorbed, so that things against the posture-and-action transition characteristics of the robot 1 are not debugged in the RCODE program.

The present invention has been described while referring to a specific embodiment. However, it is obvious that a person skilled in the art can make a modification or a substitution in the foregoing embodiment without departing form the gist of the present invention.

Although the foregoing embodiment describes an authoring tool of the present invention by exemplifying a dog-imitated quadrapedal-walking pet robot, the gist of the present invention is not limited thereto. For example, it should be fully understood that the present invention can be applied to, for example, a bipedal mobile robot such as a humanoid robot, and mobile robots other than legged mobile robots.

Moreover, an authoring tool of the present invention can be applied not to a physical machine such as a robot but to the creation and editing of an action sequence for an animation using character images generated by computer graphics.

In short, the present invention has been disclosed in the form of an embodiment and should not be interpreted in limited senses. To determine the gist of the present invention, the appended claims should be considered.

What is claimed is:

1. An authoring system for creating and editing an action-control program for controlling the action of a robot, said authoring system comprising:

an editing unit which provides a user with a work site for creating and editing a scenario concerning the action of said robot; and a converting unit which converts the scenario into a program code interpretable by said robot.

2. An authoring system according to claim 1, wherein said editing unit provides said user with components representing frequently used action statuses and processing routines or models thereof, and an operation screen on which by using a coordinate designating device to send instructions, each of the components is selectively arranged.

3. An authoring system according to claim 1, wherein said editing unit provides said user with an environment for creating and editing a script having the form of a predetermined programming language.

4. An authoring system according to claim 1, wherein said converting unit converts an action scenario represented by an arrangement of components and/or an action scenario described in the form of a script into a mnemonic code which can be interpreted by said robot.

5. An authoring system according to claim 1, further comprising communication means for transferring the program code to said robot.

6. An authoring system according to claim 5, wherein said communication means performs radio data communication with said robot.

7. An authoring system according to claim 5, wherein said communication means extracts the program code step by step and transfers the extracted program code to said robot.

8. An authoring system according to claim 5, wherein said communication means transfers the program code in an encrypted form.

9. An authoring system according to claim 5, wherein said robot includes:

an interpretation unit which interprets the program code transmitted by said communication means; and a driving-control unit which drives said robot in accordance with the result of interpretation by said interpretation unit.

10. An authoring system according to claim 9, wherein said interpretation unit in said robot interprets and executes the transmitted program code in units of steps.

11. An authoring system according to claim 9, wherein:
said robot stores posture-transition-limiting information on each action and each posture which can directly be changed from the present status of said robot and on each posture which can be changed through an action and a posture; and
based on the posture-transition-limiting information, said driving-control unit converts the content of the program code into a form which enables transition of posture.

12. An authoring system according to claim 11, wherein:
the posture-transition-limiting information is stored in the form of a directed graph composed of nodes representing possible postures of said robot and action arcs which each link two nodes having a possible transition therebetween; and
said driving-control unit searches said directed graph and converts the content of the program code into a form which enables transition of posture.

13. An authoring method for creating and editing an action-control program for controlling the action of a robot, said authoring method comprising:
an editing step which provides a user with a work site for creating and editing a scenario concerning the action of said robot; and
a converting step which converts the scenario into a program code interpretable by said robot.

14. An authoring method according to claim 13, wherein said editing step provides said user with components representing frequently used action statuses and processing routines or models thereof, and an operation screen on which by using a coordinate designating device to send instructions, each of the components is selectively arranged.

15. An authoring method according to claim 13, wherein said editing step provides said user with an environment for creating and editing a script having the form of a predetermined programming language.

16. An authoring method according to claim 13, wherein said converting step converts an action scenario represented by an arrangement of components and/or an action scenario described in the form of a script into a mnemonic code which can be interpreted by said robot.

17. An authoring method according to claim 13, further comprising a communication step for transferring the program code to said robot.

18. An authoring method according to claim 17, wherein said communication step performs radio data communication with said robot.

19. An authoring method according to claim 17, wherein said communication step extracts the program code step by step and transfers the extracted program code to said robot.

20. An authoring method according to claim 17, wherein said communication step transfers the program code in an encrypted form.

21. An authoring method according to claim 17, wherein said robot includes:
an interpretation step which interprets the program code transmitted in said communication step; and
a driving-control step which drives said robot in accordance with the result of interpretation in said interpretation step.

22. An authoring method according to claim 21, wherein said interpretation step interprets and executes the transmitted program code in units of steps.

23. An authoring method according to claim 21, wherein:
said robot stores posture-transition-limiting information on each action and each posture which can directly be changed from the present status of said robot and on each posture which can be changed through an action and a posture; and
based on the posture-transition-limiting information, said driving-control step converts the content of the program code into a form which enables transition of posture.

24. An authoring method according to claim 23, wherein:
the posture-transition-limiting information is stored in the form of a directed graph composed of nodes representing possible postures of said robot and action arcs which each link two nodes having a possible transition therebetween; and
said driving-control step searches said directed graph and converts the content of the program code into a form which enables transition of posture.

25. A storage medium physically containing, in a computer-readable form, computer software described so as to control a computer system to execute authoring processing for creating and editing an action-control program for controlling the action of a robot,
said computer software comprising:
an editing step which provides a user with a work site for creating and editing a scenario concerning the action of said robot; and
a converting step which converts the scenario into a program code interpretable by said robot.

26. A storage medium according to claim 25, wherein said editing step provides said user with components representing frequently used action statuses and processing routines or models thereof, and an operation screen on which by using a coordinate designating device to send instructions, each of the components is selectively arranged.

27. A storage medium according to claim 25, wherein said editing step provides said user with an environment for creating and editing a script having the form of a predetermined programming language.

28. A storage medium according to claim 25, wherein said converting step converts an action scenario represented by an arrangement of components and/or an action scenario described in the form of a script into a mnemonic code which can be interpreted by said robot.

29. A storage medium according to claim 25, wherein the computer software further comprises a communication step for transferring the program code to said robot.

* * * * *